US008250136B2

(12) United States Patent
Maekawa et al.

(10) Patent No.: US 8,250,136 B2
(45) Date of Patent: Aug. 21, 2012

(54) SERVER, ELECTRONIC APPARATUS, EXTERNAL APPARATUS, AND INFORMATION PROCESSING SYSTEM USING THEM, AND ELECTRONIC APPARATUS SETTING AND STATUS ACQUISITION METHOD

(75) Inventors: Hajime Maekawa, Osaka (JP); Koji Iwamoto, Nara (JP); Takumi Ikeda, Kobe (JP); Hideaki Takechi, Toyonaka (JP)

(73) Assignee: Panasonic Corporation, Osaka (JP)

( * ) Notice: Subject to any disclaimer, the term of this patent is extended or adjusted under 35 U.S.C. 154(b) by 2046 days.

(21) Appl. No.: 10/518,666

(22) PCT Filed: Jun. 9, 2003

(86) PCT No.: PCT/JP03/07255

§ 371 (c)(1),
(2), (4) Date: Dec. 17, 2004

(87) PCT Pub. No.: WO04/001611

PCT Pub. Date: Dec. 31, 2003

(65) Prior Publication Data

US 2006/0036354 A1 Feb. 16, 2006

(30) Foreign Application Priority Data

Jun. 19, 2002 (JP) ................................ 2002-178087

(51) Int. Cl.
*G06F 15/16* (2006.01)

(52) U.S. Cl. ........ 709/203; 709/223; 709/224; 709/225; 340/3.1; 340/4.61; 340/4.62

(58) Field of Classification Search .................. 709/203, 709/217, 224
See application file for complete search history.

(56) References Cited

U.S. PATENT DOCUMENTS 6,101,508 A * 8/2000 Wolff ............................ 709/223
6,653,933 B2 * 11/2003 Raschke et al. ............... 370/203
6,886,035 B2 * 4/2005 Wolff ............................ 709/219
6,924,727 B2 8/2005 Nagaoka et al.
6,931,640 B2 * 8/2005 Asano et al. .................. 718/104
7,130,903 B2 * 10/2006 Masuda et al. ................ 709/225
7,557,702 B2 * 7/2009 Eryurek et al. ............... 340/511

(Continued)

FOREIGN PATENT DOCUMENTS

JP 2002-57971 2/2002

(Continued)

OTHER PUBLICATIONS

International Search Report corresponding to application No. PCT/JP03/07255 dated Sep. 24, 2003.

*Primary Examiner* — Backhean Tiv
(74) *Attorney, Agent, or Firm* — RatnerPrestia

(57) ABSTRACT

An information processing system includes an electronic apparatus, a server, and an external apparatus. The electronic apparatus acquires operation information for the electronic apparatus from the server, and directs the electronic apparatus to operate according to the operation information. The server receives an external apparatus identifier, electronic apparatus identifier, and operation information, from the external apparatus, and accumulates the information. The external apparatus accepts input of the electronic apparatus identifier and the operation information, and transmits the external apparatus identifier and the operation information to the server. Such an information processing system enables operation information for an electronic apparatus to be set and acquired, without directly accessing an electronic apparatus from an external apparatus, improving security.

22 Claims, 26 Drawing Sheets

| Electronic apparatus identifier | | Name | Operation information | External apparatus identifier | Polling result |
|---|---|---|---|---|---|
| Global IP address | ID | | | | |
| 132.182.5.10 | 1 | My STB | Power ON, video recording ch. 140 19:00-21:00 | 090-1111-2222 | 1 |
| | 2 | My son's STB | Power ON, video recording ch. 18 10:00-12:00 | | 1 |
| | 3 | Air conditioner in the living room | Power ON | | 1 |
| 133.168.0.1 | 1 | Air conditioner at home | Power ON | 090-1122-3333 090-1111-5555 090-2222-5555 | 1 |
| | 2 | My daughter's VCR | Power ON, video recording ch. 8 10:00-11:00 | 090-2222-5555 | 0 |
| ⋮ | ⋮ | ⋮ | ⋮ | ⋮ | ⋮ |

U.S. PATENT DOCUMENTS

| | | | | |
|---|---|---|---|---|
| 7,765,328 | B2 * | 7/2010 | Bryers et al. | 709/249 |
| 7,962,248 | B2 * | 6/2011 | Flohr | 700/291 |
| 8,044,793 | B2 * | 10/2011 | Eryurek et al. | 340/517 |
| 2002/0103655 | A1 * | 8/2002 | Boies et al. | 705/1 |
| 2002/0180579 | A1 * | 12/2002 | Nagaoka et al. | 340/3.1 |
| 2005/0262508 | A1 * | 11/2005 | Asano et al. | 718/100 |
| 2006/0109134 | A1 * | 5/2006 | Aisa | 340/662 |
| 2009/0157529 | A1 * | 6/2009 | Ehlers et al. | 705/26 |

FOREIGN PATENT DOCUMENTS

| | | |
|---|---|---|
| JP | 2002-152856 | 5/2002 |
| JP | 2002-152857 | 5/2002 |
| JP | 2002-159074 | 5/2002 |
| JP | 2002-165280 | 6/2002 |
| JP | 2002-171578 | 6/2002 |
| WO | WO 02/28083 A1 | 4/2002 |

* cited by examiner

FIG. 8
| Electronic apparatus identifier | | Name | Operation information | External apparatus identifier | Polling result |
|---|---|---|---|---|---|
| Global IP address | ID | | | | |
| 132.182.5.10 | 1 | My STB | Power ON, video recording ch. 140 19:00-21:00 | 090-1111-2222 | 0 |
| | 2 | My son's STB | ——— | | 0 |
| | 3 | Air conditioner in the living room | Power ON | | 0 |
| 133.168.0.1 | 1 | Air conditioner at home | Power ON | 090-1122-3333 090-1111-5555 090-2222-5555 | 1 |
| | 2 | My daughter's VCR | Power ON, video recording ch. 8 10:00-11:00 | 090-2222-5555 | 0 |
| ⋮ | ⋮ | ⋮ | ⋮ | ⋮ | ⋮ |
FIG. 9A
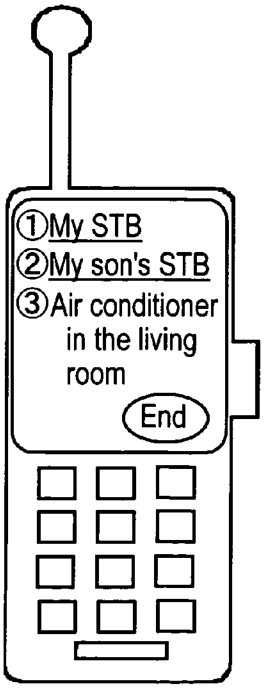
FIG. 9B
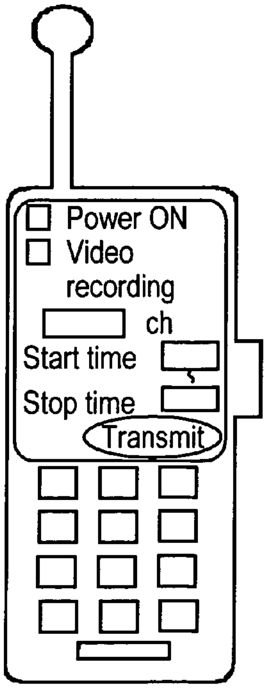
FIG. 9C
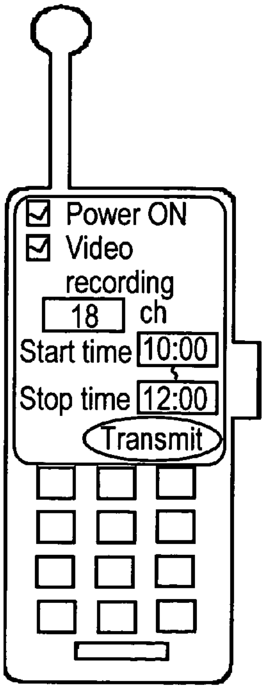

FIG. 10

Operation setting information

| External apparatus identifier | ID | Operation information |
|---|---|---|

FIG. 11

| | | |
|---|---|---|
| 090-1111-2222 | 2 | Power ON, video recording ch. 18 10:00-12:00 |

FIG. 12

| Electronic apparatus identifier | | Name | Operation information | External apparatus identifier | Polling result |
|---|---|---|---|---|---|
| Global IP address | ID | | | | |
| 132.182.5.10 | 1 | My STB | Power ON, video recording ch. 140 19:00-21:00 | 090-1111-2222 | 0 |
| | 2 | My son's STB | Power ON, video recording ch. 18 10:00-12:00 | | 0 |
| | 3 | Air conditioner in the living room | Power ON | | 0 |
| 133.168.0.1 | 1 | Air conditioner at home | Power ON | 090-1122-3333<br>090-1111-5555<br>090-2222-5555 | 1 |
| | 2 | My daughter's VCR | Power ON, video recording ch. 8 10:00-11:00 | 090-2222-5555 | 0 |
| ⋮ | ⋮ | ⋮ | ⋮ | ⋮ | ⋮ |

FIG. 13

| Electronic apparatus identifier | | Name | Operation information | External apparatus identifier | Polling result |
|---|---|---|---|---|---|
| Global IP address | ID | | | | |
| 132.182.5.10 | 1 | My STB | Power ON, video recording ch. 140 19:00-21:00 | 090-1111-2222 | 1 |
| | 2 | My son's STB | Power ON, video recording ch. 18 10:00-12:00 | | 1 |
| | 3 | Air conditioner in the living room | Power ON | | 1 |
| 133.168.0.1 | 1 | Air conditioner at home | Power ON | 090-1122-3333<br>090-1111-5555<br>090-2222-5555 | 1 |
| | 2 | My daughter's VCR | Power ON, video recording ch. 8 10:00-11:00 | 090-2222-5555 | 0 |
| ⋮ | ⋮ | ⋮ | ⋮ | ⋮ | ⋮ |

FIG. 19

| Electronic apparatus identifier: Global IP address | Electronic apparatus identifier: ID | Name | Status information | | | | External apparatus identifier |
|---|---|---|---|---|---|---|---|
| 132.182.5.10 | 1 | Air conditioner in the living room | Power ON | Temp-erature 22 | Volume of air 5 | .......... | 090-2222-3333 |
| | 2 | STB | Power ON | Tape loaded | ch 19 | Time 17:00-19:00 | |
| 131.181.0.1 | 1 | STB at home | —— | | | | 090-7777-3333 |
| ⋮ | ⋮ | ⋮ | ⋮ | | | | ⋮ |

FIG. 20

| Electronic apparatus identifier: Global IP address | Electronic apparatus identifier: ID | Name | Status information | | | | External apparatus identifier |
|---|---|---|---|---|---|---|---|
| 132.182.5.10 | 1 | Air conditioner in the living room | Power ON | Tempe-rature 22 | Volume of air 5 | .......... | 090-2222-3333 |
| | 2 | STB | Power ON | Tape loaded | ch 19 | Time 17:00-19:00 | |
| 131.181.0.1 | 1 | STB at home | Power ON | Tape loaded | ch 24 | Time 19:00-20:00 | 090-7777-3333 |
| ⋮ | ⋮ | ⋮ | ⋮ | | | | ⋮ |

| Electronic apparatus identifier | | | Name | Operation information | | External apparatus identifier | |
|---|---|---|---|---|---|---|---|
| Global IP address | ID | Priority | | Content | Priority | Phone number | Priority |
| 132.182.5.10 | 1 | 1 | STB at home | Video recording ch10 19:00-21:00 | 2 | 090-1234-5555 | 3 |
| | | | | | | 090-2222-5432 | 2 |
| | 2 | 1 | Air conditioner in the living room | Power ON Temp-erature 20°C | 1 | 090-3333-4444 | 2 |
| ⋮ | ⋮ | ⋮ | ⋮ | ⋮ | | ⋮ | ⋮ |

SERVER, ELECTRONIC APPARATUS, EXTERNAL APPARATUS, AND INFORMATION PROCESSING SYSTEM USING THEM, AND ELECTRONIC APPARATUS SETTING AND STATUS ACQUISITION METHOD

This Application is a U.S. National Phase Application of PCT International Application PCT/JP2003/007255.

TECHNICAL FIELD

The present invention relates to an information processing system for remotely setting an electronic apparatus in various types of settings and for acquiring a status thereof; to a server, electronic apparatus, and external apparatus therefor; and to a method of such setting and acquiring status information.

BACKGROUND ART

Some mobile terminals are capable of remotely operating a videocassette recorder at home to perform video recording. Even in a case of a failure to reserve recording for television programs at home, such a mobile terminal enables reserving away from home. Further, some mobile terminals are capable of remotely operating an air conditioner at home to turn on the power away from home. Such a mobile terminal enables making the room temperature comfortable when the user comes home back, which is very convenient.

Meanwhile, the Internet is becoming widely used. In addition, IP (Internet Protocol) is expected to be upgraded to version 6. Against a background of these circumstances, a large number of electronic apparatuses at home are expected to be connected to the Internet.

However, an information processing system in the above-mentioned conventional technology has direct access to electronic apparatuses at home from external apparatuses existing away from home using the Internet, for example. Therefore, the system has security problems. That is to say, unexpected external apparatuses and those of malicious users may set for operation and acquire status information of electronic apparatuses at home.

SUMMARY OF THE INVENTION

The present invention relates to an information processing system including an electronic apparatus, a server, an external apparatus, and these apparatuses composing it. The electronic apparatus is equipped with an operation information acquirer (acquirer) for acquiring operation information with which the electronic apparatus operates, from the server; and an operation controller for directing an operation of the electronic apparatus according to the operation information acquired by the acquirer. The external apparatus is equipped with an external information storage (a first storage) for storing an external apparatus identifier for identifying the external apparatus; a setting information acceptor (a first acceptor) for receiving input of an electronic apparatus identifier for identifying the electronic apparatus, and the operation information; and an operation setting information transmitter (a first transmitter) for transmitting to the server, the external apparatus identifier, the electronic apparatus identifier, and the operation information. The server is equipped with an operation information control table storage (a second storage) for storing an operation information control table including one or more operation information control records including an external apparatus identifier, an electronic apparatus identifier, and an operation information; an operation setting information receiver (a first receiver) for receiving from the external apparatus, the external apparatus identifier, the electronic apparatus identifier, and the operation information; and an operation information updating part (a first updating part) for updating the operation information control table according to the external apparatus identifier, the electronic apparatus identifier, and the operation information received by the first receiver.

Alternatively, the electronic apparatus is equipped with an electronic apparatus identifier storage (a third storage) for storing an electronic apparatus identifier for identifying the electronic apparatus; a status information storage (a fourth storage) for storing status information showing a status of the electronic apparatus; and an electronic apparatus status information transmitter (a fourth transmitter) for transmitting to the server, the electronic apparatus identifier and the status information. The server is equipped with a status information control table storage (a fifth storage) for storing a status information control table including one or more status information control records including an external apparatus identifier for identifying the external apparatus, the electronic apparatus identifier, and the status information; an electronic apparatus status information receiver (a third receiver) for receiving from an electronic apparatus, the electronic apparatus identifier and the status information; and a status information updating part (a second updating part) for updating the status information control table according to the electronic apparatus identifier received by the third receiver and the status information. The external apparatus is equipped with an external information storage (a sixth storage) for storing the external apparatus identifier; a status acquisition information acceptor (a fourth acceptor) for accepting input of status acquisition information including the electronic apparatus identifier; a status acquisition command transmitter (a fifth transmitter) for transmitting to the server, a status acquisition command including the external apparatus identifier stored in the sixth storage and the status acquisition information received by the fourth acceptor; and a status information receiver (a fourth receiver) for receiving the status information acquired according to the status acquisition command.

BRIEF DESCRIPTION OF THE DRAWINGS

FIG. 8 shows an example of an operation information control table according to the first exemplary embodiment of the present invention.

FIGS. 9A through C show examples of user-interfaces of the external apparatus according to the first exemplary embodiment of the present invention.

FIG. 10 shows an example of the structure of setting information according to the first exemplary embodiment of the present invention.

FIG. 11 shows an example of the setting information according to the first exemplary embodiment of the present invention.

FIG. 12 shows an example of the operation information control table according to the first exemplary embodiment of the present invention operation.

FIG. 13 shows an example of the operation information control table according to the first exemplary embodiment of the present invention.

FIG. 19 shows an example of a status information control table according to the second exemplary embodiment of the present invention.

FIG. 20 shows an example of the status information control table according to the second exemplary embodiment of the present invention.

DETAILED DESCRIPTION OF PREFERRED EMBODIMENTS

Hereinafter, a detailed description is made for embodiments of the present invention using some drawings. A component part, block in a flowchart, and the like with an identical mark functions in the same way, and thus description thereof may be omitted if previously mentioned.

First Exemplary Embodiment

Figure 1:
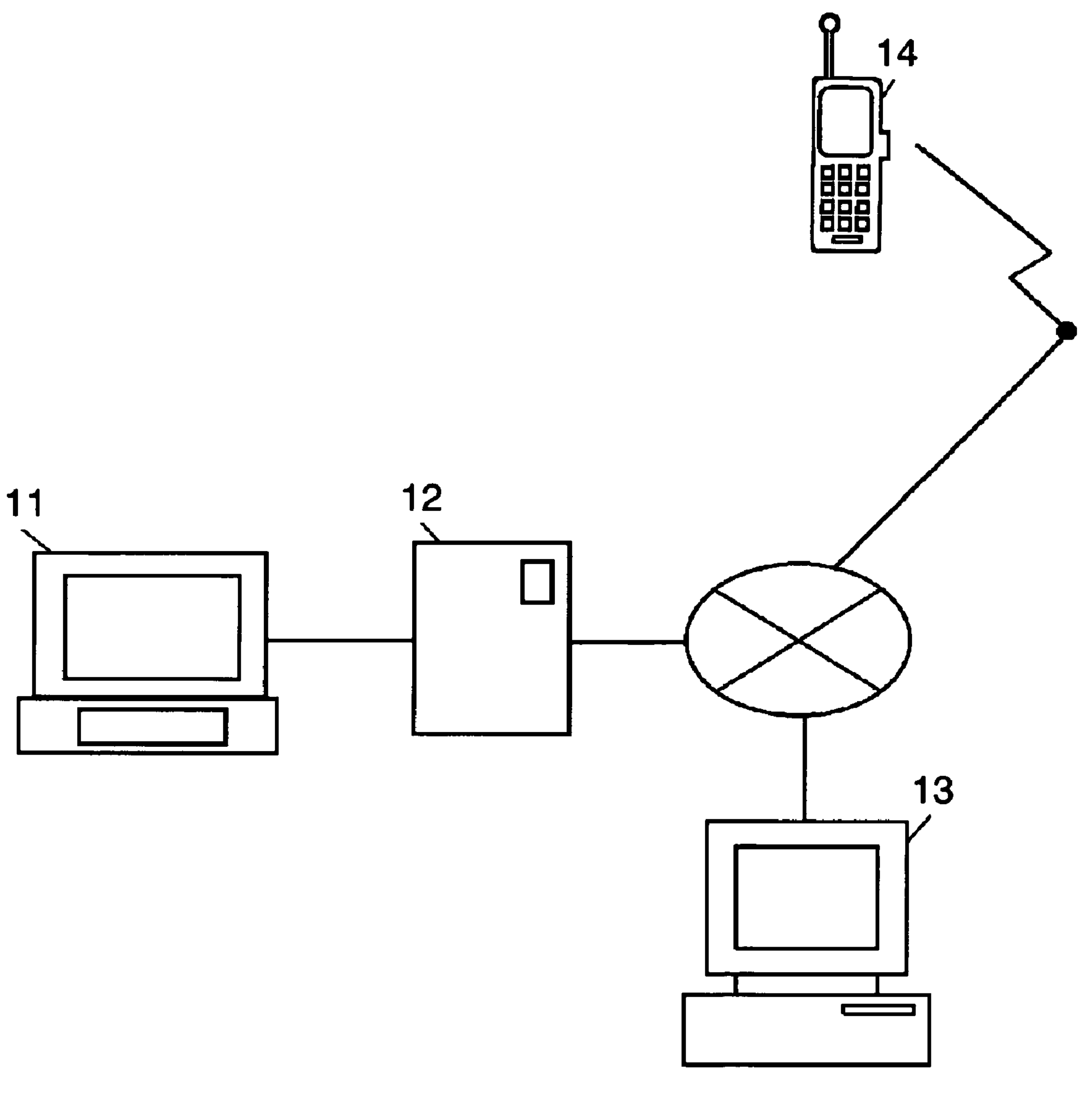
FIG. 1 is a system block diagram of an information processing system according to a first exemplary embodiment of the present invention.

FIG. 1 is a system block diagram of an information processing system according to the first exemplary embodiment. This system includes electronic apparatus 11, router 12, server 13, and external apparatus 14. Electronic apparatus 11 is an electronic apparatus to be connected to a network, such as a computer, a videocassette recorder, a refrigerator, a television set, a set top box (STB), a microwave oven. Router 12 connects electronic apparatus 11 to the Internet, performing route control, network address translation (NAT), and the like. Server 13 stores an operation information control table including one or more operation information control records including operation information for electronic apparatus 11. Server 13 is connected to the Internet. External apparatus 14 exists at a remote location from electronic apparatus 11. Although external apparatus 14 is preferably a mobile terminal, it may be fixedly installed at home or in an office. External apparatus 14 is connected to the Internet with or without wires.

Figure 2:
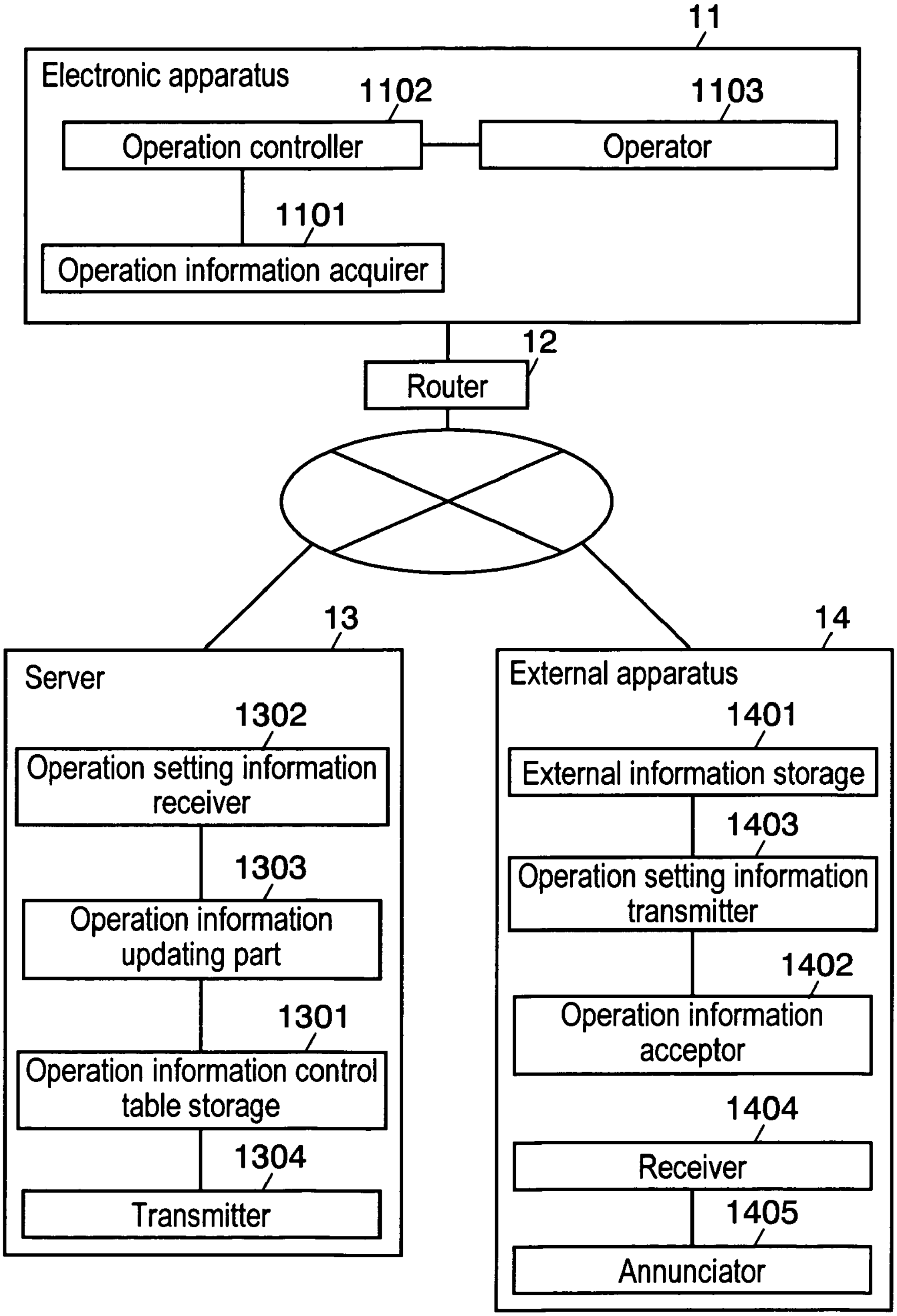
FIG. 2 is a block diagram of an information processing system according to the first exemplary embodiment of the present invention.

FIG. 2 is a block diagram of the information processing system according to this embodiment. Electronic apparatus 11 includes operation information acquirer (hereinafter, acquirer) 1101, operation controller (hereinafter, controller) 1102, and operator 1103. Server 13 includes operation information control table storage (hereinafter, storage) 1301, operation setting information receiver (hereinafter, receiver) 1302, operation information updating part (hereinafter, updating part) 1303, and transmitter 1304. External apparatus 14 includes external information storage (hereinafter, storage) 1401, setting information acceptor (hereinafter, acceptor) 1402, operation setting information transmitter (hereinafter, transmitter) 1403, receiver 1404, and annunciator 1405.

In electronic apparatus 11, acquirer 1101 acquires operation information that is information with which electronic apparatus 11 operates, from server 13. Operation information includes, for example, operation commands such as for turning on the power, turning off the power, reserving video recording, and setting information to be set to electronic apparatus 11. If electronic apparatus 11 is a videocassette recorder or the like, with a video recording function, the command for reserving video recording serves many uses. The setting information refers to a broadcast area code with which electronic apparatus 11 receives broadcasts, and communication setting information such as a POP address and DNS address with which electronic apparatus 11 communicates with an external apparatus. Here an external apparatus is, for example, another device on the Internet. Electronic apparatus 11, if equipped with a tuner and a function for receiving broadcasts, refers to a broadcast area code to set frequencies and names of broadcast stations to each channel of the tuner. This enables electronic apparatus 11 to receive broadcasts. In addition, "acquire" here includes a case where electronic apparatus 11 passively receives operation information and a case where electronic apparatus 11 actively retrieves operation information. Timing when acquirer 1101 acquires the operation information is not especially limited. Preferably, acquirer 1101 regularly acquires the operation information; however, acquirer 1101 may acquire the operation information when triggered by a user, or when notified by server 13. Acquirer 1101 is usually composed of a wireless or wired communication device (a modem and its driver software, etc.) and control software for the above-mentioned operation. Here, hardware (i.e. electronic circuit) may be used instead of the software. Acquirer 1101 may be composed of a device for receiving broadcasts instead of a communication device.

Controller 1102 directs so that electronic apparatus 11 operates according to the operation information acquired by acquirer 1101. Timing when controller 1102 directs is not especially limited. In addition, timing when controller 1102 directs can vary depending on the contents of operation information. For example, if the operation information is a command for video recording, controller 1102 directs so that electronic apparatus 11 starts video recording at the start time for video recording included in the command. If the operation information is a command for turning on the power, controller 1102 may direct so that the power is immediately turned on (main power ON). If the operation information is communication setting information, controller 1102 directs so that electronic apparatus 11 communicates according to the communication setting information being set, when a direction to start communications is made from a user. Still, if an operation direction after acquiring the information is not given immediately according to the operation information acquired by controller 1102, the operation information is accumulated in a storage medium which is not illustrated. Although this storage medium is preferably a nonvolatile one, a volatile one is accepted. Controller 1102 may be implemented with hardware although usually implemented with software.

Operator 1103 performs various types of operations, which vary depending on what electronic apparatus 11 is. For example, if electronic apparatus 11 is a videocassette recorder, operator 1103 functions, for example, for turning on/off the power, recording/replaying video. Operator 1103 is usually composed with software and hardware.

In server 13, storage 1301 stores an operation information control table. The operation information control table includes one or more operation information control records each including an external apparatus identifier, an electronic apparatus identifier, and operation information. The external apparatus identifier is information for identifying external apparatus 14, and the electronic apparatus identifier is for identifying electronic apparatus 11. Although storage 1301 is preferably composed of a nonvolatile storage medium, a volatile one is also acceptable.

Receiver 1302 receives from external apparatus 14, operation setting information including the external apparatus identifier, the electronic apparatus identifier, and the operation information. Receiver 1302 is usually composed of a wireless or wired communication device; however, a device for receiving broadcasts can be used.

Updating part 1303 updates the operation information control table in storage 1301 according to the operation setting information received by receiver 1302. This "update" includes adding a record to the operation information control table, and correcting a certain attribute value in the record. Updating part 1303 is usually composed of a central processing unit (CPU, not illustrated) and software for operating the CPU; however, it may be composed of hardware (an electronic circuit).

Transmitter 1304, when a process in server 13 is completed, transmits the circumstances to external apparatus 14, and also transmits the operation information to electronic apparatus 11. Transmitter 1304 may be integrated with receiver 1302.

In external apparatus 14, storage 1401 stores the external apparatus identifier. Storage 1401 is preferably composed of a nonvolatile storage medium; however, a volatile one may be used. Here, the external apparatus identifier may be whatever information to identify the external apparatus. For example, it is an IP address of the external apparatus, MAC address thereof, or phone number of the external apparatus if it is a mobile phone.

Acceptor 1402 accepts input of setting information including the electronic apparatus identifier and operation information. The setting information may be either information input by a user or one transmitted from another apparatus. That is to say, acceptance of input includes reception of information. Acceptor 1402 is usually a keyboard driver, a remote control driver, or the like. That is to say, acceptor 1402 is composed of software and hardware accepting information input from an input device such as a keyboard or a remote controller. However, acceptor 1402 may be a communication device for receiving information or broadcast receiving device.

Transmitter 1403 transmits to server 13, the external apparatus identifier stored in storage 1401, and operation setting information including the setting information received by acceptor 1402. Timing when the operation setting information is transmitted to server 13 is not especially limited. Usually, the operation setting information is transmitted to server 13 according to directions by a user of external apparatus 14. Here, external apparatus 14 may regularly transmit the operation setting information to server 13. Transmitter 1403 is usually composed of a wireless or wired communication device; however, a broadcasting device may be used.

Receiver 1404 receives process results in server 13.

Annunciator 1405 annunciates results received by receiver 1404 to the user via voice and/or display.

Hereinafter, a description is made for the operation of the information processing system. First, an operation of electronic apparatus 11 is described referring to FIG. 3.

(S301) Acquirer 1101 judges if it is the time to acquire from server 13, operation information that is information with which the electronic apparatus operates. For example, acquirer 1101 tries to regularly acquire the operation information. If it is the time to acquire, the processing goes to S302; otherwise, returns to S301.

(S302) Acquirer 1101 connects to server 13.

(S303) Acquirer 1101 acquires the operation information from server 13.

(S304) Controller 1102 judges whether or not the operation information acquired at S303 is to be immediately executed. There are various methods for this judgment. For example, the operation information may include an operation start time. In such a case, controller 1102 checks the present time and judges that the command in the operation information be executed, if the present time agrees with or is past the operation start time included in the operation information. Meanwhile, the operation information may not include an operation start time. In such a case, electronic apparatus 11 retains an operation start time (operation start timing) corresponding to the command included in the operation information, and controller 1102 may judge that operation be started at the operation start time. When judged to be immediately executed, the processing goes to S305; otherwise, to S306.

(S305) Controller 1102 directs so that operator 1103 operates according to the operation information, and so operator 1103 operates according to the operation information.

(S306) Acquirer 1101 accumulates the operation information acquired at S303. Here, the operation information accumulated is executed at the predetermined execution time or timing. In other words, the command included in the operation information is executed.

Figure 3:
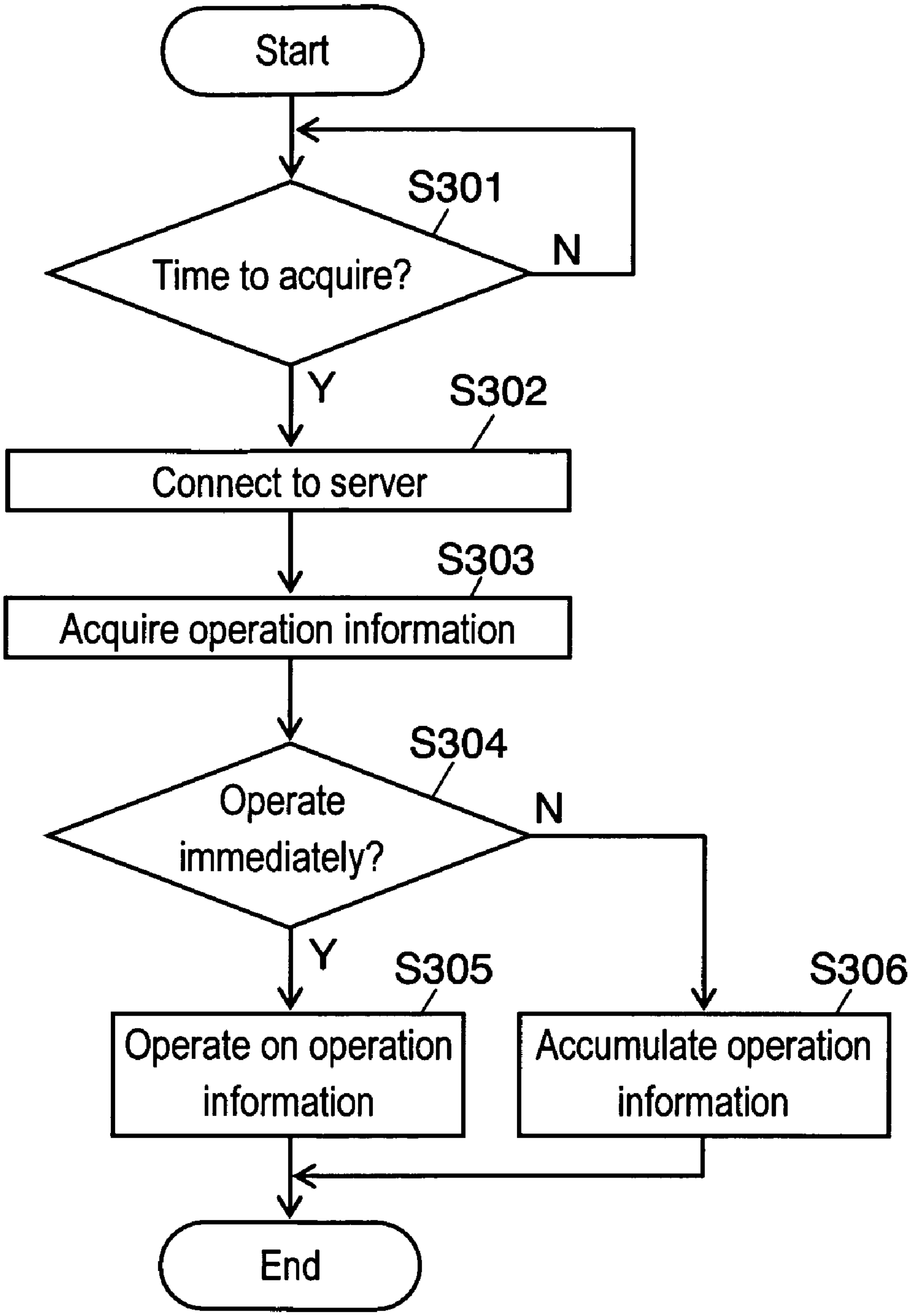
FIG. 3 is a flowchart illustrating an operation of an electronic apparatus according to the first exemplary embodiment of the present invention.

In FIG. 3, electronic apparatus 11 regularly acquires the operation information, where the timing and algorithm to acquire operation information is not especially limited. In addition, when electronic apparatus 11 acquires the operation information from server 13, electronic apparatus 11 usually requests server 13 to transmit the operation information. Server 13 transmits the operation information to electronic apparatus 11 according to the transmission request.

Figure 4:
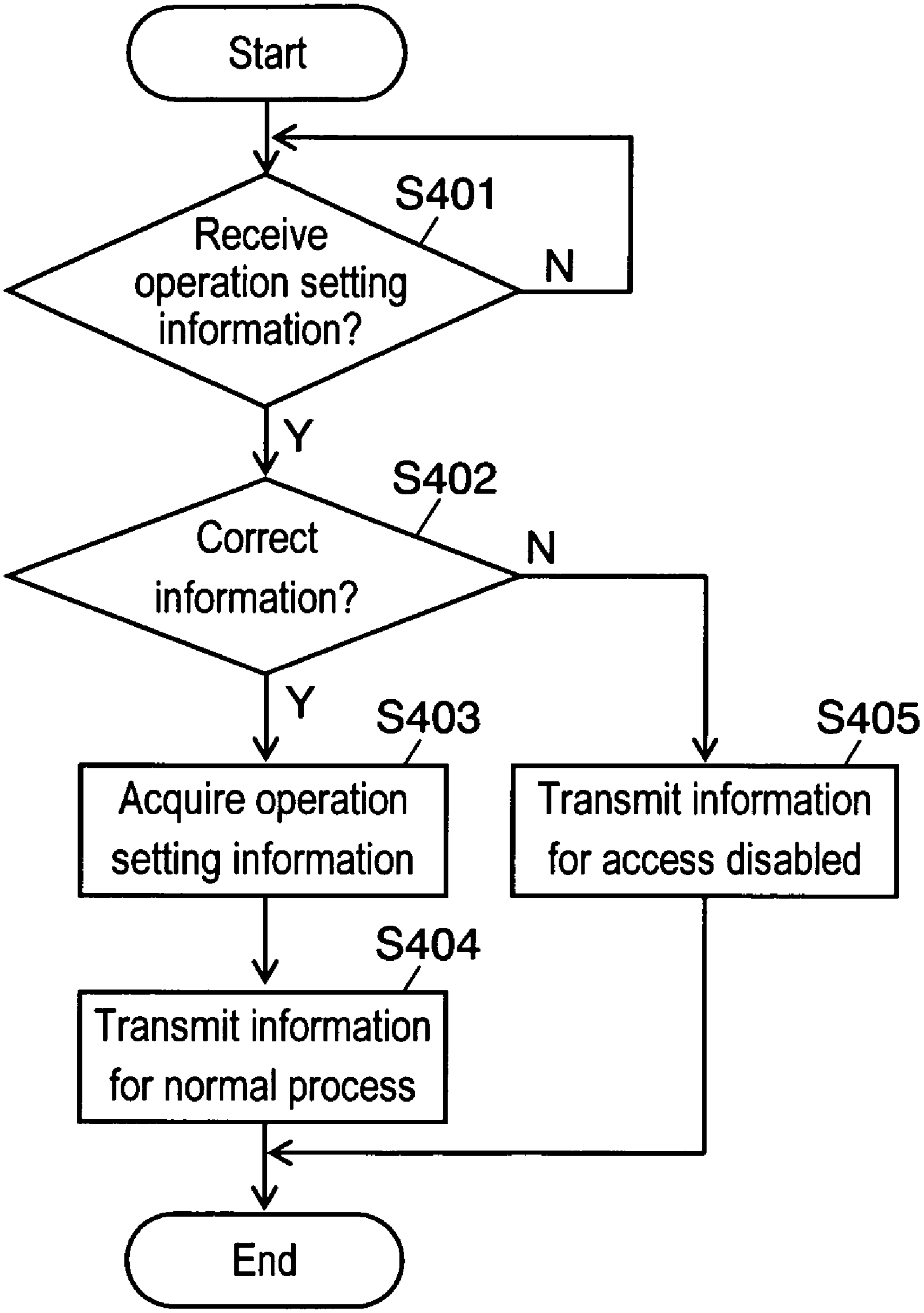
FIG. 4 is a flowchart illustrating an operation of a server according to the first exemplary embodiment of the present invention.

Next, a description is made for an operation in which server 13 receives and accumulates operation setting information from external apparatus 14, referring to FIG. 4.

(S401) Receiver 1302 judges whether or not the operation setting information including an external apparatus identifier, an electronic apparatus identifier, and the operation information has been received from external apparatus 14. If operation setting information has been received, the processing goes to S402; otherwise, returns to S401.

(S402) Updating part 1303 judges whether or not the operation setting information received at S401 is correct information, by the external apparatus identifier and the electronic apparatus identifier included in the operation setting information received at S401. If correct, the processing goes to S403; otherwise, to S405.

(S403) Updating part 1303 accumulates the operation setting information received at S401. Here, "accumulate" means, for example, "add" a record to the operation information control table stored in storage 1301. In addition, "accumulate" means, for example, "update" a record in the operation information control table stored in storage 1301. In other words, updating part 1303 changes one or more attribute values included in a record.

(S404) Server 13, via transmitter 1304, transmits to external apparatus 14, information showing that the process has been normally completed. Such information is, for example, stored preliminarily in server 13.

(S405) Server 13, via transmitter 1304, transmits to external apparatus 14, information showing that external apparatus 14 is unable to access server 13. Here, such information is, for example, stored preliminarily in server 13. In FIG. 4, the operation to transmit messages from server 13 at S404 and S405 to external apparatus 14 may be dispensed with.

Figure 5:
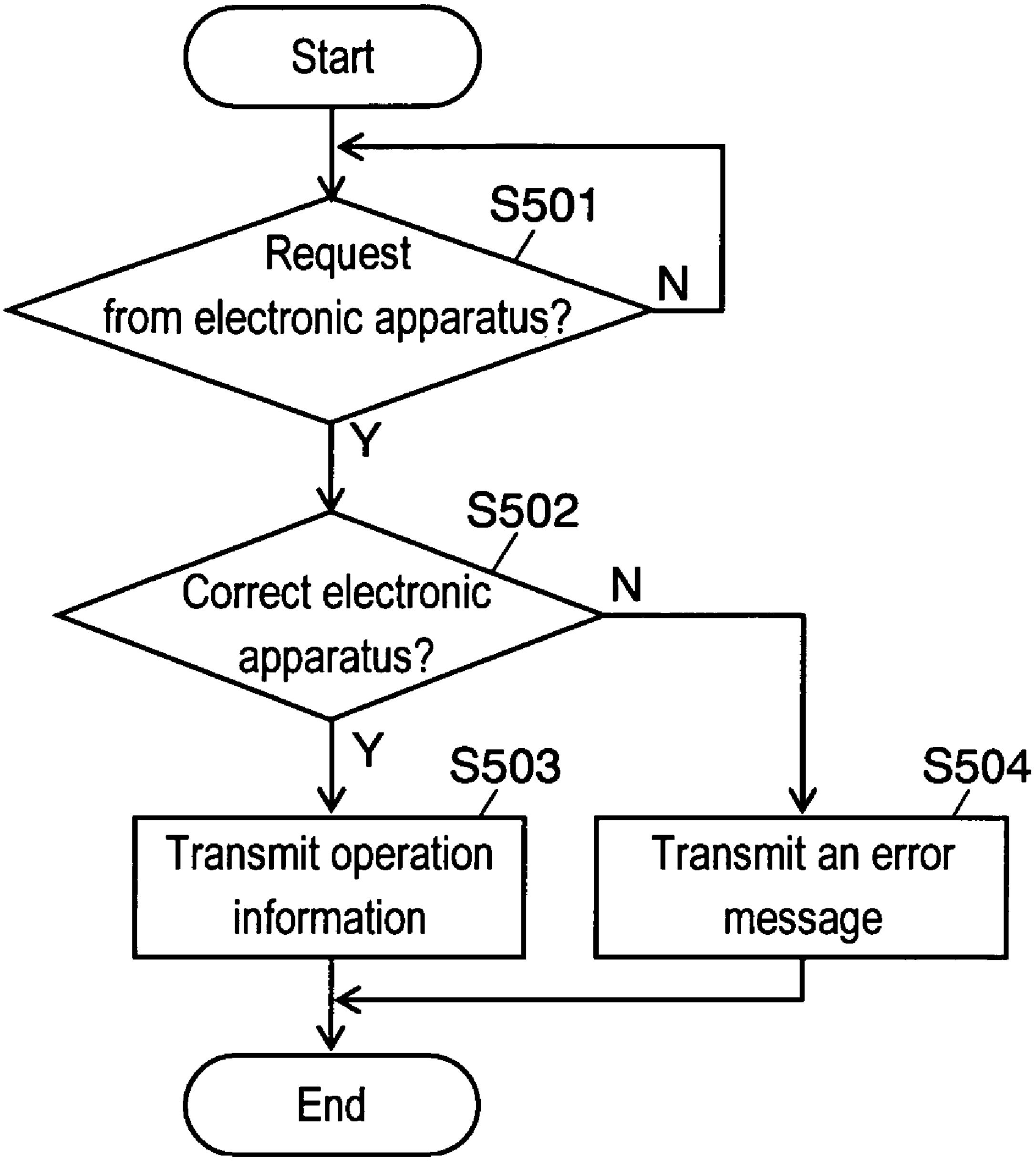
FIG. 5 is a flowchart illustrating another operation of the server according to the first exemplary embodiment of the present invention.

Next, a description is made for an operation in which server 13 transmits the operation information according to a request from electronic apparatus 11, referring to FIG. 5.

(S501) Server 13 judges whether or not a transmission request for the operation information was made from electronic apparatus 11. If a transmission request has been made, the processing goes to S502; otherwise, returns to S501.

(S502) Server 13 judges whether or not electronic apparatus 11 that has made a transmission request is a correct electronic apparatus based on the transmission request at S501. This judgment is, for example, made with the following method. The transmission request has an electronic apparatus identifier. Then, if the electronic apparatus identifier included in the transmission request is stored in the operation information control table included in server 13, the electronic apparatus that has made a transmission request is judged to be a correct electronic apparatus. Otherwise, the electronic apparatus that has made a transmission request is judged to be an incorrect electronic apparatus. If electronic apparatus 11 that has made a transmission request is a correct electronic apparatus, the processing goes to S503; otherwise, goes to S504.

(S503) Server 13, via transmitter 1304, transmits the operation information to electronic apparatus 11.

(S504) Server 13 transmits, via transmitter 1304, an error message to electronic apparatus 11. Still, the error message is preliminarily retained, for example, by server 13. However, in FIG. 5, the operation to transmit the error message is not essential.

Figure 6:
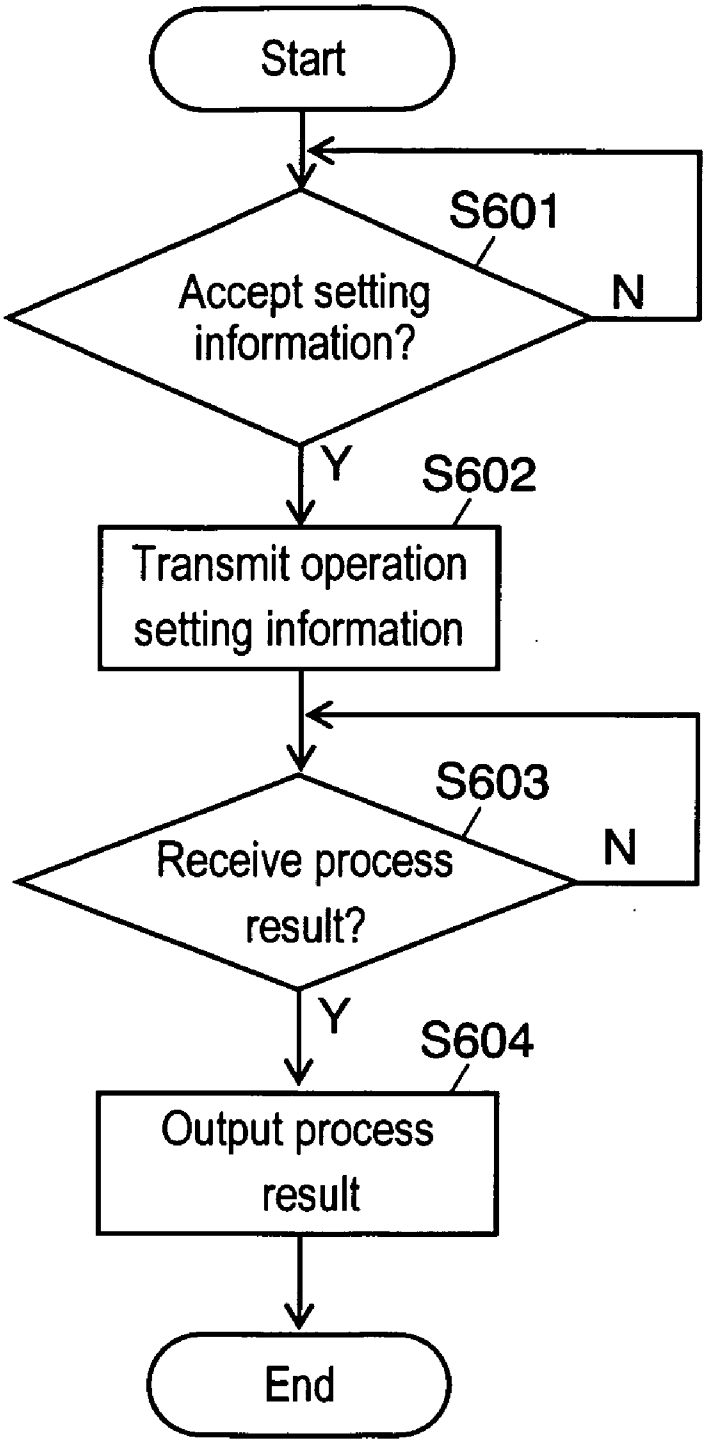
FIG. 6 is a flowchart illustrating an operation of an external apparatus according to the first exemplary embodiment of the present invention.

Next, a description is made for an operation in which external apparatus 14 transmits the operation setting information to the server, referring to FIG. 6.

(S601) Acceptor 1402 judges whether or not input of the setting information including the electronic apparatus identifier and the operation information has been accepted. If the input of setting information has been accepted, the processing goes to S602; otherwise, returns to 601. Here, "accept input of the setting information" refers to accepting a series of input, for example, including accepting a command to transmit the setting information to server 13.

(S602) Transmitter 1403 acquires the external apparatus identifier stored in storage 1401, and transmits to server 13, the external apparatus identifier and the operation setting information accepted at S601, which includes the setting information.

(S603) Receiver 1404 judges whether or not receiver 1404 has received the process result in server 13. The process result refers to information showing whether or not the operation setting information transmitted at S602 has been correctly processed in server 13. If the process result has been received, the processing goes to S604; otherwise, returns to S603.

(S604) Annunciator 1405 outputs the process result received by receiver 1404 at S603.

Here, in FIG. 6, the processes of receiving and outputting the result at S603 and S604 may be dispensed with. In such a case, receiver 1404 and annunciator 1405 are not particularly needed.

Figure 7:
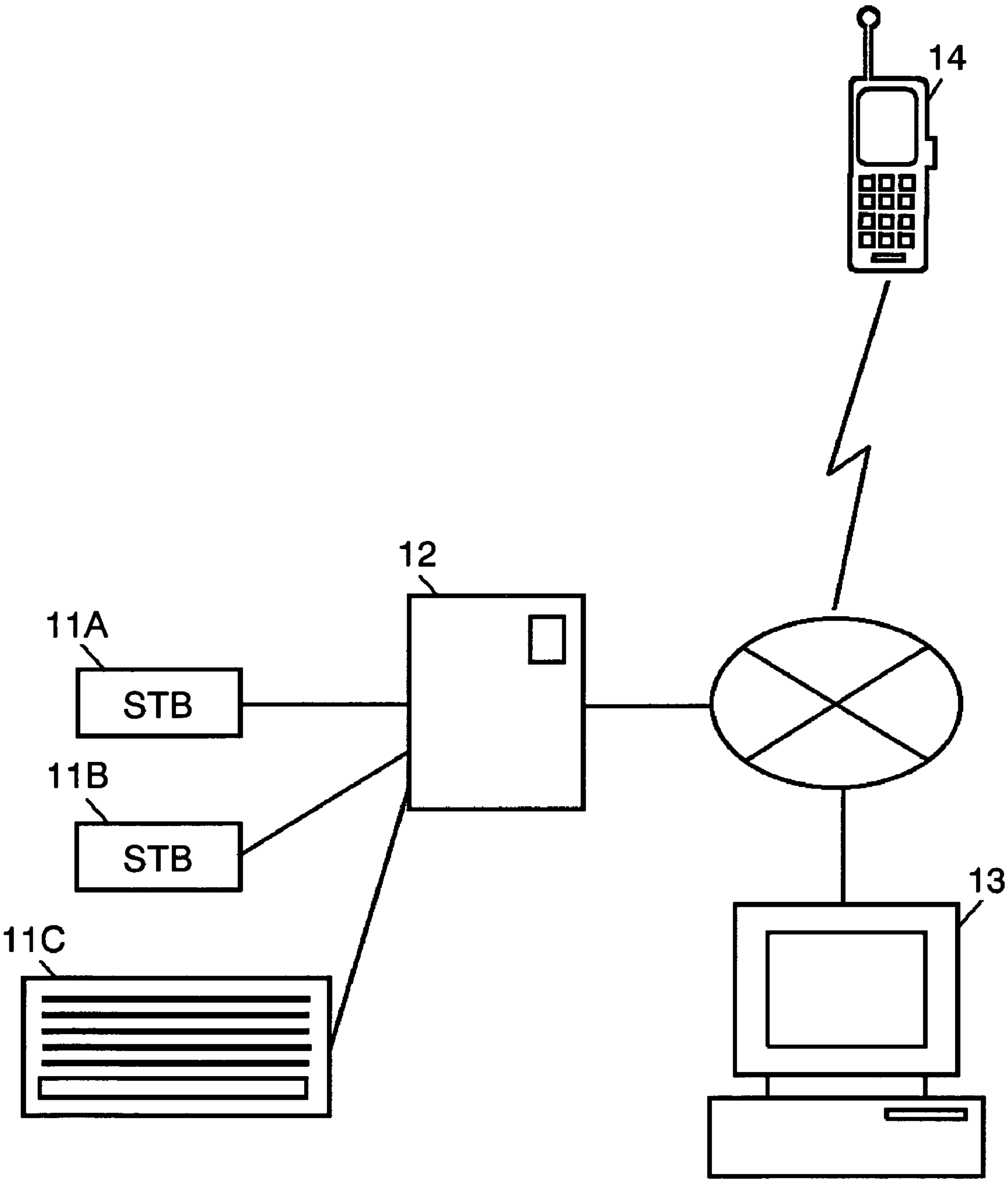
FIG. 7 is a concrete system block diagram of the information processing system according to the first exemplary embodiment of the present invention.

Hereinafter, a description is made for a concrete operation of the information processing system according to the embodiment. FIG. 7 is a block diagram of a concrete information processing system. The information processing system includes STB 11A, STB 11B, air conditioner 11C, router 12, server 13, and external apparatus 14. Here, the identifier, "ID", for STB 11A is "1," and its name is "my STB." "ID" of STB 11B is "2," and its name is "my son's STB." "ID" of an air conditioner is "3," and its name is "air conditioner in the living room." Still, the global IP address allocated to router 12 is "132.182.5.10". STB 11A, STB 11B, and air conditioner 11C are located at home and connected via router 12 to the Internet. Further, external apparatus 14 is a so-called mobile phone.

Next, FIG. 8 shows an example for the operation information control table retained by server 13. The operation information control table includes an operation information control record including the following attribute values: electronic apparatus identifier, name, operation information, external apparatus identifier, and polling result. The electronic apparatus identifier is composed of a global IP address and identifier (ID). The electronic apparatus identifier is information for identifying an electronic apparatus. Here, a global IP address and ID identify an electronic apparatus. The global IP address is an IP address for accessing router 12 from external apparatus 14 and server 13 therewith. The ID is information for identifying an electronic apparatus connected to router 12.

The name is an appellation (a colloquial term) given to each electronic apparatus, with which a user identifies an electronic apparatus. The external apparatus identifier is information for identifying an external apparatus, where in this case, it is a phone number of a mobile phone. The polling result is information showing whether or not electronic apparatus 11 (STB 11A, STB 11B, or air conditioner 11C, in this case) has acquired operation information. If the polling result is "0," it shows electronic apparatus 11 has not yet acquired operation information; if "1," already acquired. The polling result is information showing that the operation information has been transmitted from server 13 to electronic apparatus 11, also called operation information transmission history information. In FIG. 8, the operation information of electronic apparatus 11B whose name is "my son's STB" shows that it has no data. That is to say, electronic apparatus 11B with "my son's STB" is registered; however, it isn't set with the operation information. Meanwhile, for electronic apparatus 11A with "my STB" or the like, the operation information is set. The operation information of "my STB" is "power ON, video recording ch. 140, 19:00-21:00." This operation information is to direct as follows: turn on the power of "my STB" to record the broadcast of channel 140 from 19:00 to 21:00.

In the above-mentioned condition, operation setting information shown in FIGS. 9A through C is input from external apparatus 14, which is a mobile phone, and is transmitted to server 13. First, external apparatus 14 accesses server 13 to notify of transmitting operation setting information. In this case, the information including the phone number of external apparatus 14: "090-1111-2222" is transmitted from external apparatus 14 to server 13. Next, server 13 receives information including "090-1111-2222," and acquires all information with names corresponding to the external apparatus identifier "090-1111-2222" from the table in FIG. 8. Then, server 13 transmits the information with the names acquired to external apparatus 14. Next, external apparatus 14 receives the information with the names transmitted from server 13, to display a menu. An example of this menu is shown in FIG. 9A. The information for button "End" composing the menu in FIG. 9A may be transmitted from server 13, or may be preliminarily retained by external apparatus 14. Next, the user of external apparatus 14 selects, for example, the menu entry "(2) my son's STB" from the menu in FIG. 9A. Next, external apparatus 14 displays a screen (panel) linked to the menu entry "(2) my son's STB" as shown in FIG. 9B. The information for composing the menu in FIG. 9B may be transmitted from server 13, or may be preliminarily retained by external apparatus 14. Next, the user of external apparatus 14, viewing the screen shown in FIG. 9B, inputs operation information as shown in FIG. 9C. FIG. 9C shows that the user of external apparatus 14 has checked the box "power ON," and thus the operation information includes information for "power ON." FIG. 9C further shows that the user of external apparatus 14 has checked the box "video recording," and thus the operation information includes information for "video recording." FIG. 9C still further shows that the user of external apparatus 14 has input channel "18", start time "10:00", stop time "12:00," and thus the operation information includes information for ch. 18, 10:00-12:00." That is to say, the operation information having been input in FIG. 9C is information for "power ON, video recording ch. 18, 10:00-12:00."

FIG. 10 shows a structure of the operation setting information. The operation setting information includes an external apparatus identifier, ID, and operation information. The phone number of external apparatus 14 is substituted for the external apparatus identifier. The phone number of external apparatus 14, which is a mobile phone, is preliminarily stored in external apparatus 14. The ID is information for identifying a target electronic apparatus to be controlled with operation information. The ID is determined, for example, when a menu entry in FIG. 9A is selected. That is to say, the ID is maintained corresponding to the menu entry in FIG. 9A. The ID corresponding to the menu entry "(2) my son's STB" in FIG. 9A is "2." The operation information is, for example, the information input from the panel in FIG. 9C. Consequently, the setting information including the operation information input from external apparatus 14 in FIG. 9C is a value set as shown in FIG. 11. Then, the setting information in FIG. 11 is transmitted to server 13.

Next, server 13 receives the operation setting information shown in FIG. 11. Then, server 13 accumulates "power ON, video recording ch. 18, 10:00-12:00" as a set of attribute values of operation information corresponding to the external apparatus identifier "090-1111-2222" and ID "2." The above-mentioned operation updates the operation information control table in FIG. 8 as shown in FIG. 12.

Next, STB 11A, STB 11B, air conditioner 11C, or router 12 in FIG. 7 regularly operates to acquire operation information by means of polling server 13. Consequently, STB 11A and the like acquire each corresponding operation information from the operation information control table in FIG. 12 to execute and/or accumulate it. Then, the attribute value of the polling result corresponding to a part of operation information acquired by the electronic apparatus is updated from "0" to "1" in the operation information control table in FIG. 12. That is to say, updating part 1303 also updates operation information transmission history information (polling result), when operation information is transmitted to an electronic apparatus. FIG. 13 shows the operation information control table with the polling result being updated.

According to this embodiment described hereinbefore, when operation setting for an electronic apparatus at home, connected to the Internet is performed, for example, from an external apparatus such as a mobile phone, the electronic apparatus is not accessed from the external apparatus directly, but via a server, and thus security is retained.

In this embodiment, the description is made taking a global IP address in IP version 4 as an example of a part of information composing the electronic apparatus identifier. However, the electronic apparatus identifier may be whatever information as long as it enables the electronic apparatus to communicate with a server and the like, such as a global IP address in IP version 6. In addition, the electronic apparatus identifier especially may include the host address in an IP address in IP version 6. This situation also may be applied to other embodiments.

The description is made assuming that external apparatus 14 is a mobile phone, and the external apparatus identifier is a phone number of the mobile phone. However, external apparatus 14 may be a desktop computer, portable laptop personal computer, or the like, and the external apparatus identifier may be whatever information as long as it can identify the external apparatus. For example, the external apparatus identifier may be a global IP address in IP version 6, or the like. This situation also may be applied to other embodiments.

Further, the operation of electronic apparatus 11, external apparatus 14, and server 13 described in this embodiment may be described in software to control general-purpose devices. Such software may be distributed, for example, by means of downloading the software on a server. Further the software may be distributed with a storage medium such as a CD-ROM. This situation also can be applied to all other embodiments.

Second Exemplary Embodiment

Figure 14:
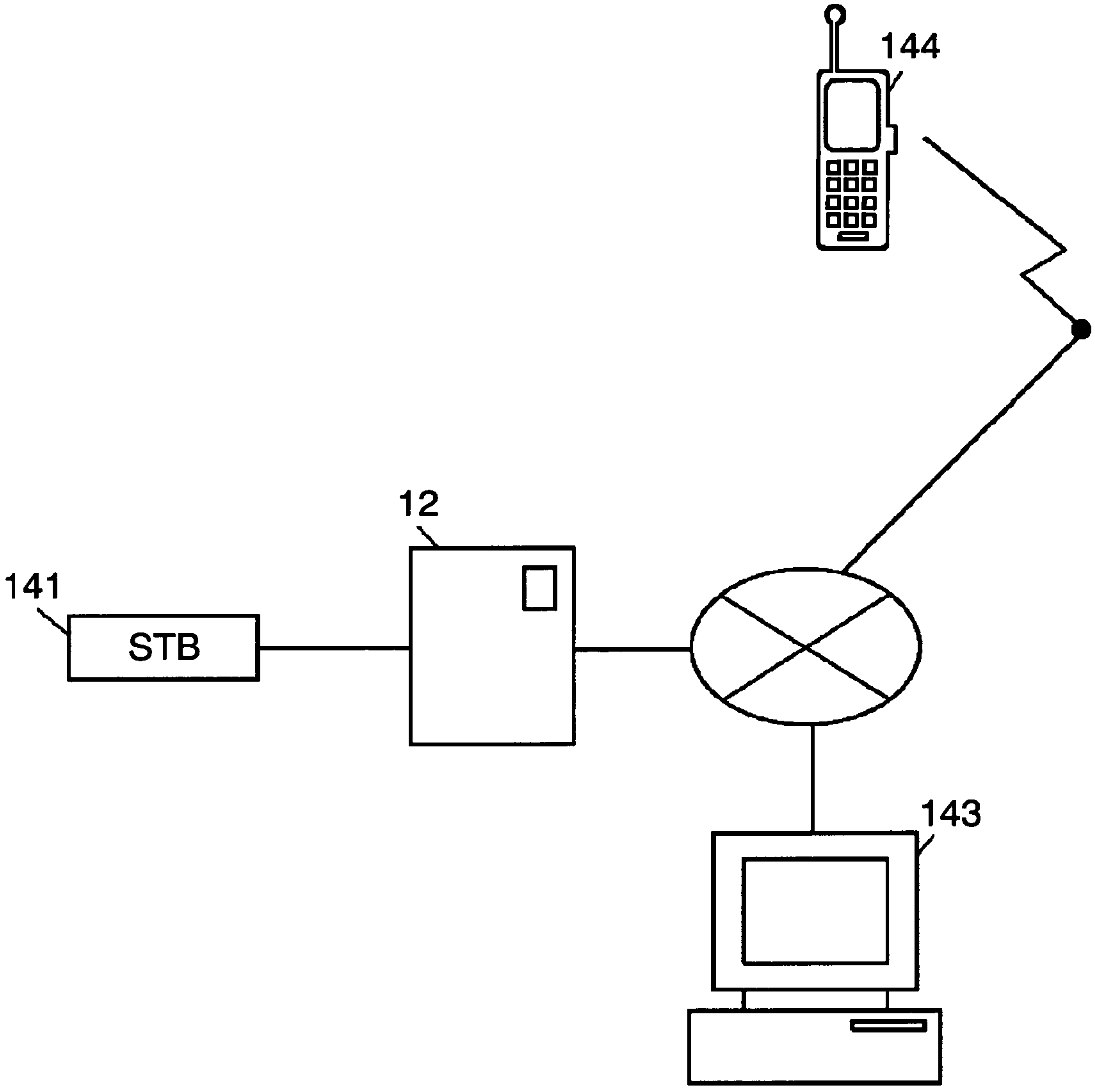
FIG. 14 is a system block diagram of an information processing system according to a second exemplary embodiment of the present invention.

FIG. 14 is a system block diagram of an information processing system according to the second exemplary embodiment. The system includes electronic apparatus 141, router 12, server 143, and external apparatus 144. Electronic apparatus 141, connected to a network, may be a computer, a videocassette recorder, a refrigerator, a television set, set top box (STB), a microwave oven, or the like. Router 12 is the same as in the first exemplary embodiment. Server 143 stores a status information control table including one or more status information control records including status information showing the status of an electronic apparatus. Server 143 is connected to the Internet. External apparatus 144, an electronic apparatus located at a remote location from electronic apparatus 141, is preferably a mobile terminal; however it may be fixedly installed at home or in an office. External apparatus 144 is to be connected to the Internet via wireless or wires.

Figure 15:
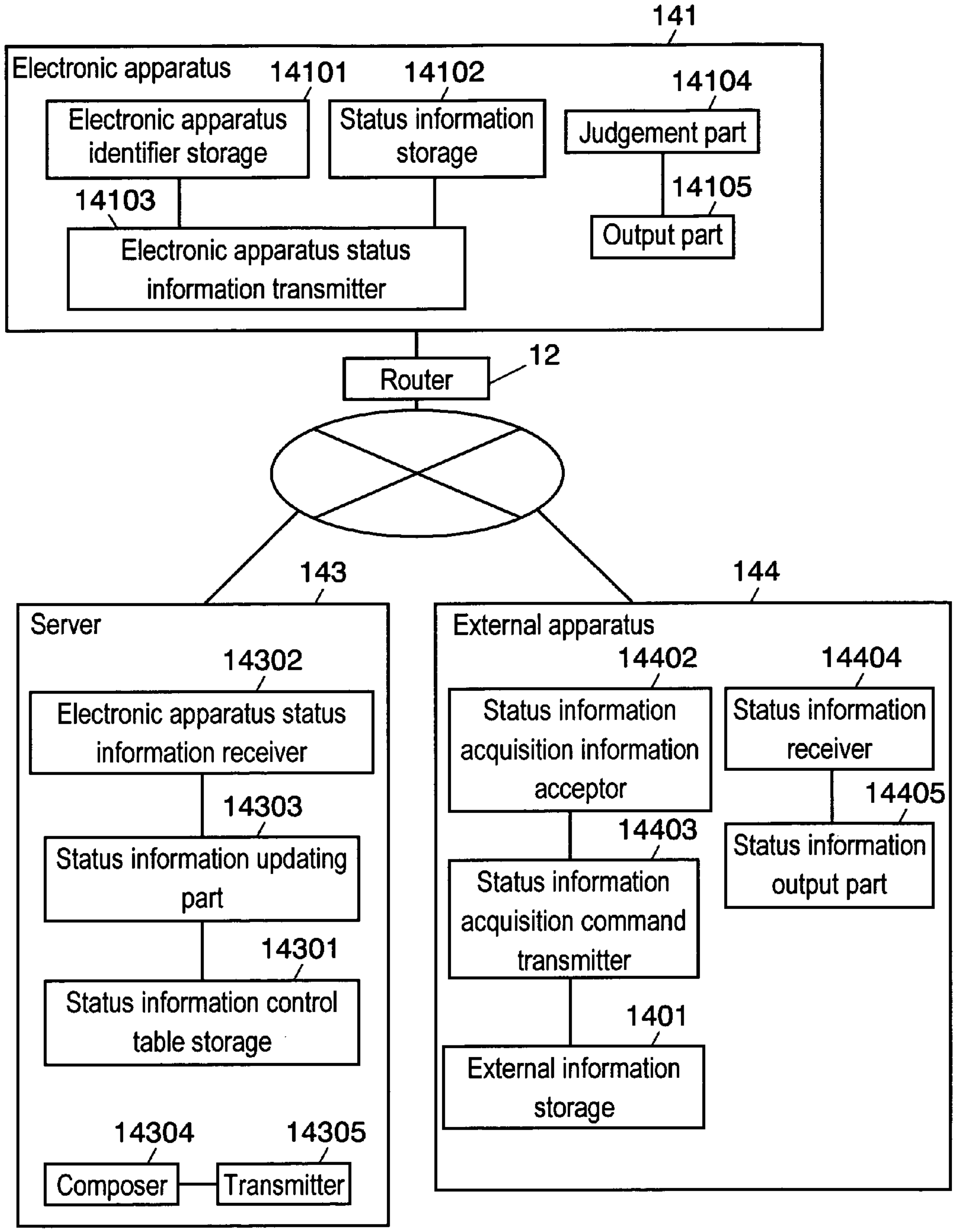
FIG. 15 is a block diagram of the information processing system according to the second exemplary embodiment of the present invention.

FIG. 15 is a block diagram of the information processing system according to this embodiment. Electronic apparatus 141 includes electronic apparatus identifier storage (hereinafter, storage) 14101, status information storage (hereinafter, storage) 14102, electronic apparatus status information transmitter (hereinafter, transmitter) 14103, judgment part 14104, and output part 14105. Server 143 includes status information control table storage (hereinafter, storage) 14301, electronic apparatus status information receiver (hereinafter, receiver) 14302, status information updating part (hereinafter, updating part) 14303, composer 14304, and transmitter 14305. External apparatus 144 includes storage 1401, status acquisition information acceptor (hereinafter, acceptor) 14402, status acquisition command transmitter (hereinafter, transmitter) 14403, status information receiver (hereinafter, receiver) 14404, and status information output part (hereinafter, output part) 14405.

In electronic apparatus 141, storage 14101 stores an electronic apparatus identifier, which is information for identifying electronic apparatus 141. Storage 14102 stores status information, which is information showing the status of electronic apparatus 141. Storages 14101 and 14102 are preferably composed of nonvolatile storage mediums; however volatile ones are acceptable.

Transmitter 14103 transmits to server 143, electronic apparatus status information including the electronic apparatus identifier and the status information. Transmitter 14103 is usually composed of a wireless or wired communication device; however, a broadcasting device is acceptable. Timing when transmitter 14103 transmits the electronic apparatus status information to server 143 is not especially limited.

Judgment part 14104 judges whether or not the process result of the electronic apparatus status information has been received from server 143, as well as whether or not the process result having been received is information showing an error. Judgment part 14104 is usually composed of a central processing unit (CPU, not illustrated) and software for operating the CPU; however, it may be composed of hardware (an electronic circuit).

When judgment part 14104 judges that the received process result is information showing an error, output part 14105 outputs a message (a process result) showing the received error.

In server 143, storage 14301 stores the aforementioned status information control table. The status information control table includes one or more status information control records including the external apparatus identifier that is information for identifying an external apparatus, the electronic apparatus identifier, and the status information. Storage 14301 is preferably a nonvolatile storage medium; however, a volatile one may be used.

Receiver 14302 receives the electronic apparatus status information from electronic apparatus 141. Receiver 14302 is usually a wireless or wired communication device; however, a device for receiving broadcasts (tuner and its driver software, etc.) can be used.

Updating part 14303 updates the status information control table according to electronic apparatus status information received at receiver 14302. Updating part 14303 is usually composed of a CPU (not illustrated) or the like, and software for operating the CPU; however, it may be composed of hardware (an electronic circuit).

Composer 14304 composes a message to transmit to electronic apparatus 141, according to a condition in which the processes ended normally or not in storage 14301, receiver 14302, and updating part 14303.

Transmitter 14305 transmits the message composed by composer 14304 to electronic apparatus 141.

In external apparatus 144, acceptor 14402 accepts input of status acquisition information including the electronic apparatus identifier. The status acquisition information may be either information input by a user or one transmitted from another device. That is to say, acceptance of input includes receiving. Acceptor 14402 is usually a keyboard driver, a remote control driver, or the like. That is to say, acceptor 14402 is composed of software and hardware accepting information having been input from an input device such as a keyboard or a remote control. Here, acceptor 14402 may be a communication device or broadcast receiving device that receives information.

Transmitter 14403 transmits to server 143, a status acquisition command including the external apparatus identifier stored in storage 1401, and the status acquisition information accepted by acceptor 14402. Transmitter 14403 is usually a wireless or wired communication device; however, a broadcasting device may be used.

Receiver 14404 receives from server 143, status information acquired according to the status acquisition command. Receiver 14404 is usually a wireless or wired communication device; however, a device that receives broadcasts may be used.

Output part 14405 outputs the status information received by receiver 14404. This output usually refers to display to a display device; however, it includes a voice output, printing by a printer, vibration by a vibrator or the like. In addition, output may be transmitting of the status information to an external display device or the like. Output part 14405, for example, is composed of a display device and its driver software if the output is display on the display device.

Hereinafter, a description is made for an operation of the information processing system. First, an operation of electronic apparatus 141 is described referring to FIG. 16.

(S1601) Transmitter 14103 judges whether or not it is the time to transmit the electronic apparatus status information. Here, the electronic apparatus status information is transmitted to server 143 regularly at a predetermined time. However, a timing, conditions and the like in which the electronic apparatus status information is transmitted may be different. For example, if the status information of electronic apparatus 141 changes, transmission may be immediately performed. When it is the time to transmit the electronic apparatus status information, the processing goes to S1602; otherwise, returns to S1601.

(S1602) Transmitter 14103 acquires the electronic apparatus identifier from storage 14101.

(S1603) Transmitter 14103 acquires the status information from storage 14102.

(S1604) Transmitter 14103 composes the electronic apparatus status information using the electronic apparatus identifier acquired at S1602, and the status information acquired at S1603.

(S1605) Transmitter 14103 transmits to server 143, the electronic apparatus status information composed at S1604.

(S1606) Judgment part 14104 judges whether or not the process result of the electronic apparatus status information in server 143 has been received. If the process result has been received, the processing goes to S1607; otherwise, returns to S1606.

(S1607) Judgment part 14104 judges whether or not the process result received at S1606 is information showing an error. If an error, the processing goes to S1608; otherwise, returns to S1601.

(S1608) Output part 14105 outputs a message (the process result) showing an error, received at S1606, and then returns to S1601.

Figure 16:
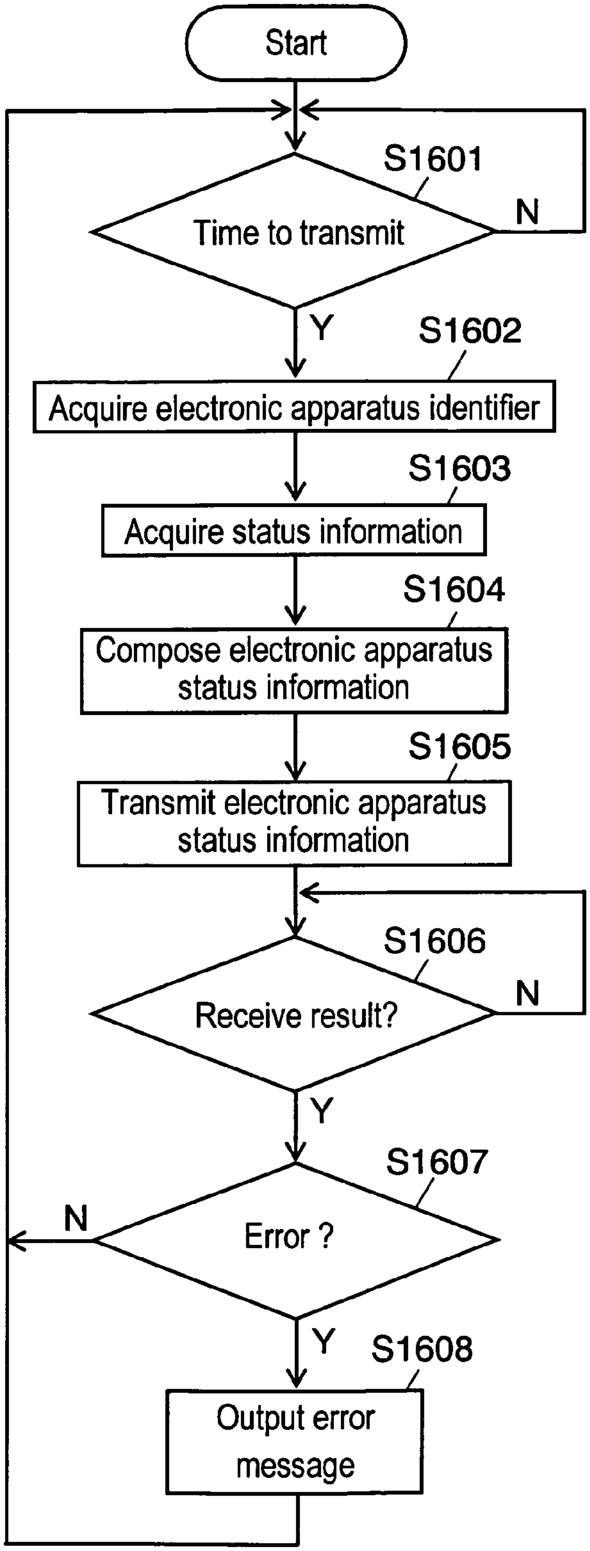
FIG. 16 is a flowchart illustrating an operation of an electronic apparatus according to the second exemplary embodiment of the present invention.

Here, in FIG. 16, if an interrupt by such as power OFF occurs, the process ends. In addition, in FIG. 16, the processes S1606 through S1608 are not essential, so they may be cut out. In such a case, judgment part 14104 and output part 14105 can be dispensed with.

Figure 17:
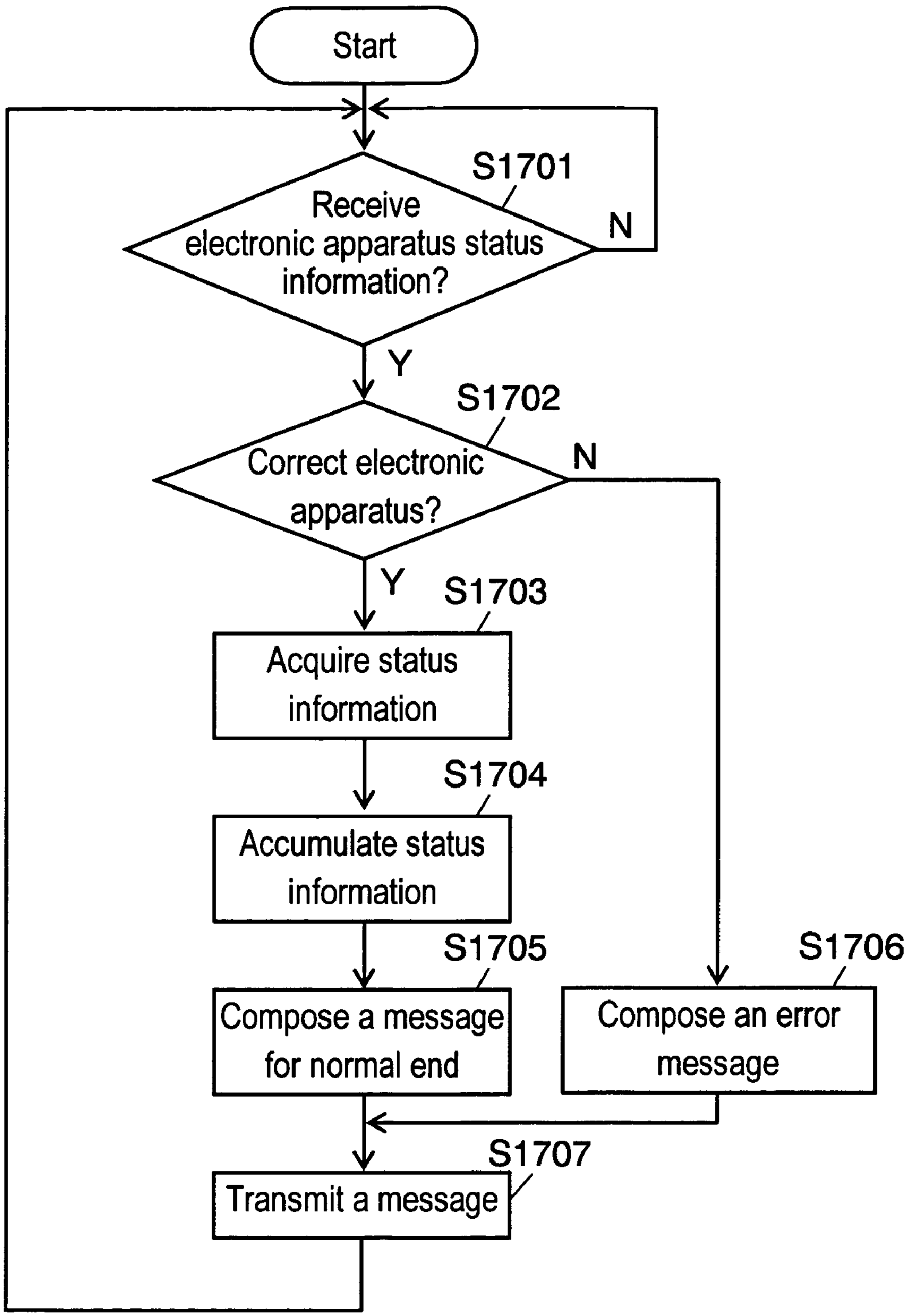
FIG. 17 is a flowchart illustrating an operation of a server according to the second exemplary embodiment of the present invention.

Next, a description is made for an operation in which server 143 receives the electronic apparatus status information and accumulates the status information, referring to FIG. 17.

(S1701) Receiver 14302 judges whether or not the electronic apparatus status information has been received. If the electronic apparatus status information has been received, the processing goes to S1702; otherwise, returns to S1701.

(S1702) Updating part 14303 judges whether or not the electronic apparatus that transmitted the electronic apparatus status information is a correct electronic apparatus, by the electronic apparatus status information received at S1701. There are various methods for the judgment. For example, one method is to judge whether or not the electronic apparatus identifier included in the electronic apparatus status information exists in the status information control table. That is to say, updating part 14303 judges that the electronic apparatus that has transmitted the electronic apparatus status information is a correct electronic apparatus, if the electronic apparatus identifier exists in the status information control table; otherwise, an incorrect electronic apparatus. If judged to be a correct electronic apparatus, the processing goes to S1703; otherwise, jumps to S1706.

(S1703) Updating part 14303 acquires the status information from the electronic apparatus status information received at S1701.

(S1704) Updating part 14303 accumulates the status information acquired at S1703 in a corresponding position in the status information control table. A corresponding position is, for example, an address where the attribute value of a record at which the status information is to be stored is recorded.

(S1705) Composer 14304 composes a message showing a normal end.

(S1706) Composer 14304 composes an error message.

(S1707) Transmitter 14305 transmits the message composed at S1705 or S1706 to electronic apparatus 141.

Here, in FIG. 17, if an interrupt by such as power OFF occurs, the process ends. In addition, in FIG. 17, the processes S1705 through S1707 are not essential and can be cut out. In such a case, composer 14304 and transmitter 14305 can be dispensed with.

Figure 18:
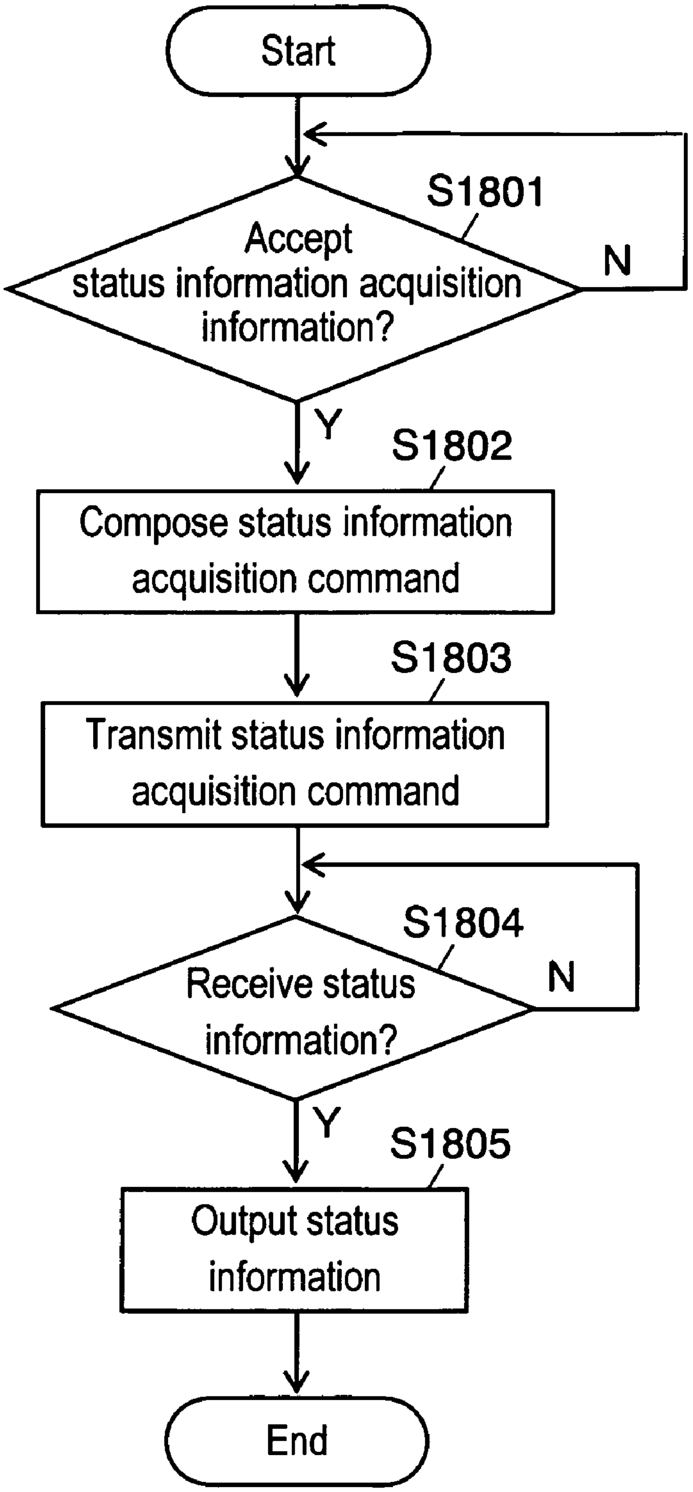
FIG. 18 is a flowchart illustrating an operation of an external apparatus according to the second exemplary embodiment of the present invention.

Next, a description is made for an operation in which external apparatus 144 acquires and outputs the status information of the electronic apparatus, referring to FIG. 18.

(S1801) Acceptor 14402 judges whether or not input of the status acquisition information has been received. If the input of the status acquisition information has been received, the processing goes to S1802; otherwise, returns to S1801.

(S1802) Transmitter 14403 acquires the external apparatus identifier stored in storage 1401, and composes a status acquisition command using the external apparatus identifier and the status acquisition information accepted at S1801.

(S1803) Transmitter 14403 transmits to server 143, the status acquisition command composed at S1802.

(S1804) Receiver 14404 judges whether or not the status information has been received. If the status information has been received, the processing goes to S1805; otherwise, returns to S1804.

(S1805) Output part 14405 outputs the status information received at S1804.

Here, server 143, when receiving the status acquisition command from external apparatus 144, judges whether or not the external apparatus is a correct external apparatus (external apparatus being controlled), from the external apparatus identifier included in the status acquisition command. If the external apparatus is a correct one, server 143 transmits, to the external apparatus, status information corresponding to the external apparatus identifier. This process is a processing of an information retrieval from a client device to a server in a server/client model in a conventional technology, and thus a detailed description is omitted.

Hereinafter, a description is made for a concrete operation of the information processing system in this embodiment. In the block diagram of the information processing system shown in FIG. 14, electronic apparatus 141 is a set top box (STB), and external apparatus 144 is a mobile phone. Video recording information is set to electronic apparatus 141 with its power ON. For example, storage 14102 in electronic apparatus 141 stores "power ON, tape loaded, video recording ch. 24, 19:00-20:00." This status information means the power is ON, a tape is loaded, information for reserving video recording is "record a broadcast on channel 24 from 19:00 to 20:00." Storage 14101 stores "ID=1." Still, the status information control table in server 143 is composed as shown in FIG. 19. The status information control table in FIG. 19 includes a status information control record composed of the attribute values of an electronic apparatus identifier, a name, operation information, and an external apparatus identifier. The electronic apparatus identifier, the name, and the external apparatus identifier are the same as described in the first exemplary embodiment using FIG. 8, thus the description is omitted. In FIG. 19, the status information of the electronic apparatus whose name is "STB at home" shows that it has no data. That is to say, the electronic apparatus, "STB at home", is registered; however, status information has not been set.

In the above-mentioned status, for example, electronic apparatus 141 regularly acquires its own status information and transmits to server 143. Electronic apparatus 141, "STB at home", acquires the status information stored in storage 14102: "power ON, tape loaded, video recording ch. 24, 19:00-20:00," and the ID (the electronic apparatus identifier) of electronic apparatus 141: "1." Then, electronic apparatus 141 transmits them to server 143 via router 12. The global IP address "131.181.0.1" is allocated to router 12. Router 12 transmits to server 143, the status information and the ID transmitted by electronic apparatus 141, with the global IP address added.

Next, server 143 receives the status information: "power ON, tape loaded, video recording ch. 24, 19:00-20:00", ID: "1", and global IP address "131.181.0.1". Then, server 143 judges whether or not electronic apparatus 141 is a correct device, by the global IP address and ID received. Here, the global IP address "131.181.0.1" received exists as shown in FIG. 19, and ID "1" also exists corresponding to the global IP address "131.181.0.1". Therefore, server 143 judges electronic apparatus 141 transmitted status information and the like as a correct electronic apparatus.

Next, server 143 retrieves the status information received to accumulate it as status information corresponding to a global IP address and an ID. FIG. 20 shows the status information control table after the accumulation.

Figure 21:
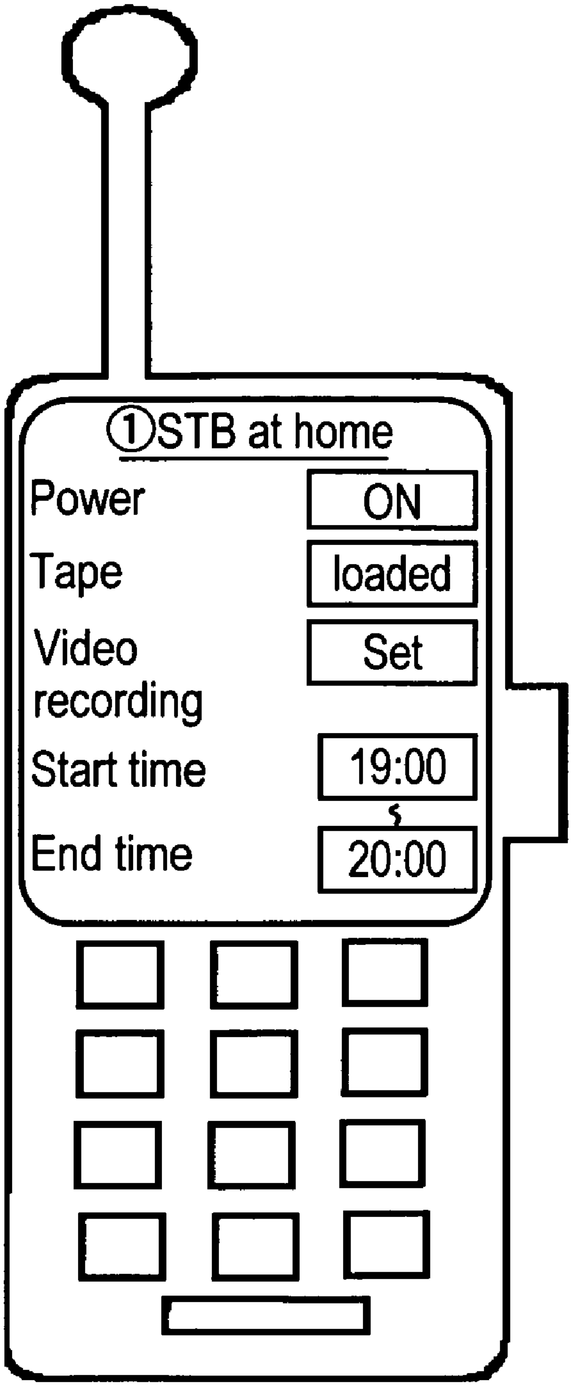
FIG. 21 shows an output example of status information for a mobile phone as the external apparatus according to the second exemplary embodiment of the present invention.

Here, the phone number of the external apparatus 144 that is a mobile phone is "090-7777-3333." Therefore, status acquisition command including the external apparatus of the phone number "090-7777-3333" is transmitted from external apparatus 144 to server 143. Next, server 143 judges whether or not the phone number "090-7777-3333" is a correct (i.e. registered) external apparatus by the status information control table and others, and judges to be correct. Next, server 143 transmits to external apparatus 144, the electronic apparatus status information including the status information corresponding to the phone number: "power ON, tape loaded, video recording ch. 24, 19:00-20:00" and the ID: "1". Then, external apparatus 144 receives the status information including the status information, "power ON, tape loaded, video recording ch. 24, 19:00-20:00", and the ID: "1", then outputs it. FIG. 21 shows an output example for status information in external apparatus 144.

As described above, according to this embodiment, an external server accumulates status information for an electronic apparatus at a remote location such as home, and an external apparatus such as a mobile phone acquires the status information for the electronic apparatus at home without directly accessing the electronic apparatus. Accordingly, the status information for an electronic apparatus can be acquired from an external apparatus without being externally accessed improperly.

Third Exemplary Embodiment

Figure 22:
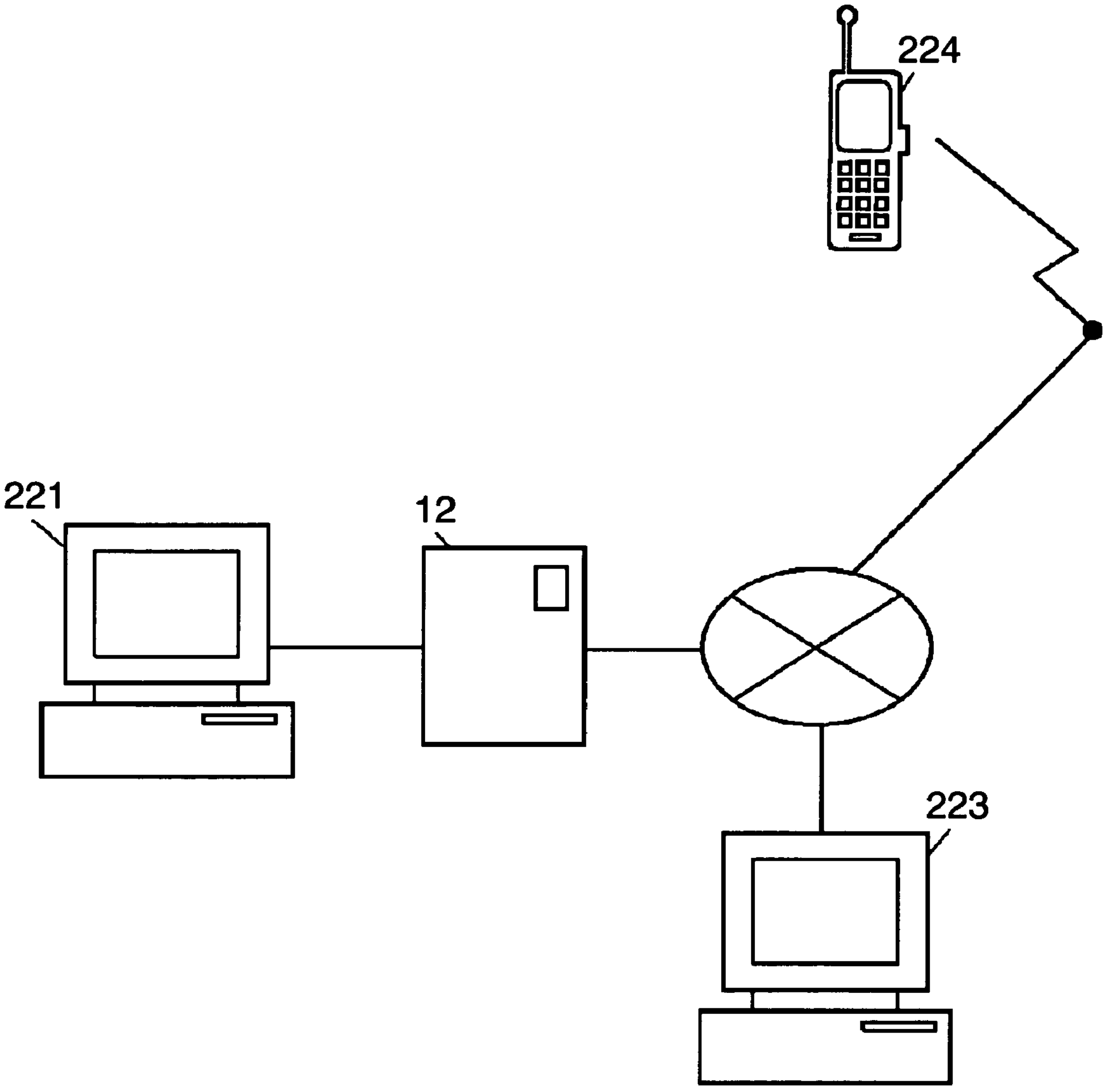
FIG. 22 is a system block diagram of an information processing system according to a third exemplary embodiment of the present invention.

FIG. 22 is a system block diagram of an information processing system according to the third exemplary embodiment. The information processing system includes electronic apparatus 221, router 12, server 223, and external apparatus 224. Electronic apparatus 221 is an electronic apparatus connected to a network, such as a computer, a videocassette recorder, a refrigerator, a television set, a set top box (STB), a microwave oven, or the like. Server 223 stores an operation information control table including an operation information control record including operation information of the electronic apparatus. Server 223 is connected to the Internet. External apparatus 244, an electronic apparatus existing at a remote location from electronic apparatus 221, is preferably a mobile terminal; however it may be fixedly installed at home or in an office. External apparatus 224 is to be connected to the Internet via wireless or wires.

Figure 23:
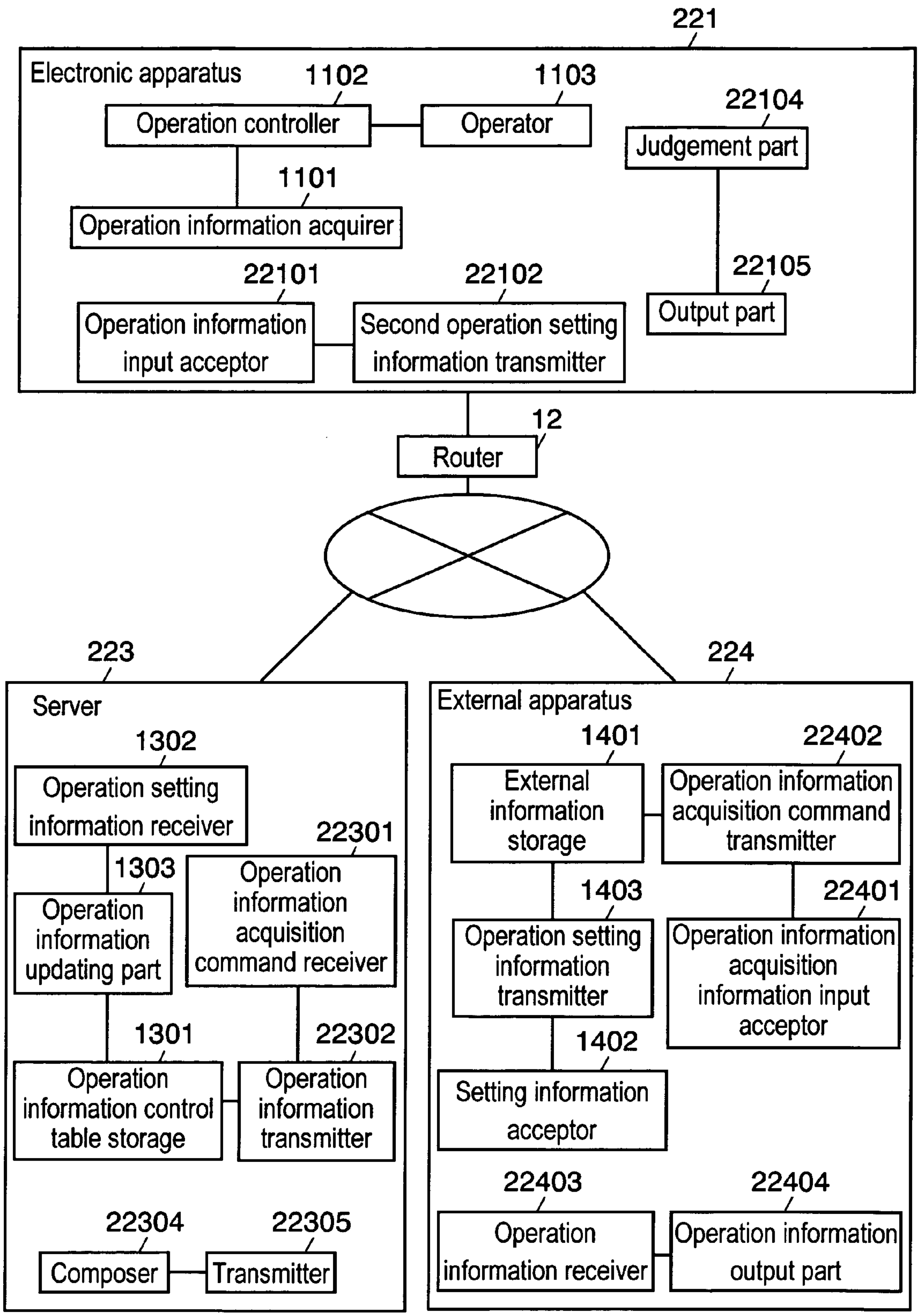
FIG. 23 is a block diagram of the information processing system according to the third exemplary embodiment of the present invention.

FIG. 23 is a block diagram of the information processing system according to the embodiment. Electronic apparatus 221 includes operation information acquirer (hereinafter, acquirer) 1101, operation controller (hereinafter, controller) 1102, operator 1103, operation information input acceptor (hereinafter, acceptor) 22101, second operation setting information transmitter (hereinafter, transmitter) 22102, judgment part 22104, and output part 22105. Server 223 includes operation information control table storage (hereinafter, storage) 1301, operation setting information receiver (hereinafter, receiver) 1302, operation information updating part (hereinafter, updating part) 1303, operation information acquisition command receiver (hereinafter, receiver) 22301, operation information transmitter (hereinafter, transmitter) 22302, composer 22304, and transmitter 22305. External apparatus 224 includes external information storage (hereinafter, storage) 1401, setting information acceptor (hereinafter, acceptor) 1402, operation setting information transmitter (hereinafter, transmitter) 1403, operation information acquisition information input acceptor (hereinafter, acceptor) 22401, operation information acquisition command transmitter (hereinafter, transmitter) 22402, operation information receiver (hereinafter, receiver) 22403, and operation information output part (hereinafter, output part) 22404.

In electronic apparatus 221, acceptor 22101 accepts input of operation information. This operation information may be either information input by a user, or one transmitted from another device. That is to say, acceptance of input includes receiving. Acceptor 22101 is usually a keyboard driver, a remote control driver, or the like. That is to say, acceptor 22101 is composed of software and hardware accepting information input from an input device such as a keyboard or a remote controller. Here, acceptor 22101 may be a communication device or broadcast receiving device that receives information.

Transmitter 22102 transmits to server 223, the operation information received by acceptor 22101, and second operation setting information including an electronic apparatus identifier. Here, electronic apparatus 221 preliminarily retains the electronic apparatus identifier. Transmitter 22102 is usually a wireless or wired communication device; however, it may be composed of a broadcasting device.

Judgment part 22104 judges whether or not the process result of electronic apparatus status information has been received from server 223. In addition, judgment part 22104 judges whether or not the process result received is information showing an error. Judgment part 22104 is usually composed of a CPU (not illustrated) and software to operate it; however, it may be composed of hardware (an electronic circuit).

When output part 22105 judges that a process result received by judgment part 22104 is information showing an error, output part 22105 outputs a message (the process result) received showing the error.

In server 223, receiver 22301 receives the operation information acquisition command from external apparatus 224. Receiver 22301 is usually a wireless or wired communication device; however, it may be composed of a broadcasting device.

When receiver 22301 receives the operation information acquisition command, transmitter 22302 acquires operation information corresponding to the operation information acquisition command, and transmits the operation information to external apparatus 224. Transmitter 22302 is usually a wireless or wired communication device; however, it may be composed of a broadcasting device.

Composer 22304 composes a message to transmit to electronic apparatus 221, according to whether or not processes in storage 1301, receiver 1302, and updating part 1303 have normally ended.

Transmitter 22305 transmits to electronic apparatus 221, a message composed by composer 22304.

In external apparatus 224, acceptor 22401 accepts input of operation information acquisition information including an electronic apparatus identifier. Acceptor 22401 is usually a keyboard driver, a remote control driver, or the like. That is to say, acceptor 22401 is composed of software and hardware accepting information input from an input device such as a keyboard or a remote controller. Here, acceptor 22401 may be composed of a communication device or a broadcast receiving device that receives information.

Transmitter 22402 transmits to server 223, an operation information acquisition command including operation information acquisition information accepted by acceptor 22401 and an external apparatus identifier. Here, the external apparatus identifier is stored in storage 1401. Transmitter 22402 is usually a wireless or wired communication device; however, however, it may be composed of a broadcasting device.

Receiver 22403 receives operation information acquired according to the operation information acquisition command transmitted. The operation information is transmitted from server 223. Receiver 22403 is usually a wireless or wired communication device; however, it may be composed of a broadcast receiving device.

Output part 22404 outputs the operation information received by receiver 22403. "Output" usually refers to display to a display device; however, it includes printing by a printer, voice output, transmitting to another device, vibration by a vibration, or the like. Output part 22404, for example, is composed of a display device and its driver software.

Hereinafter, an operation of the information processing system is described. First, a description is made for an operation in which electronic apparatus 221 accepts input of operation information and transmits to server 223, referring to FIG. 24. The process in which electronic apparatus 221 acquires operation information from server 223, and operates according to the information is the same as in the first exemplary embodiment, and thus the description is omitted.

(S2401) Acceptor 22101 judges whether or not acceptor 22101 has accepted input of operation information. If accepted, the processing goes to S2402; otherwise, returns to S2401.

(S2402) Transmitter 22102 acquires an electronic apparatus identifier retained by electronic apparatus 221.

(S2403) Transmitter 22102 composes second operation setting information, according to the operation information accepted at S2401 and the electronic apparatus identifier acquired at S2402.

(S2404) Transmitter 22102 transmits the second operation setting information composed at S2403.

(S2405) Judgment part 22104 judges whether or not the process result in server 223 has been received. If received, the processing goes to S2406; otherwise, returns to S2405.

(S2406) Judgment part 22104 judges whether or not the process result received at S2405 is one showing an error. If an error, the processing goes to S2407; otherwise, returns to S2401.

(S2407) Output part 22105 outputs a message (the process result) received at S2405, showing an error, and then the processing returns to S2401.

Figure 24:
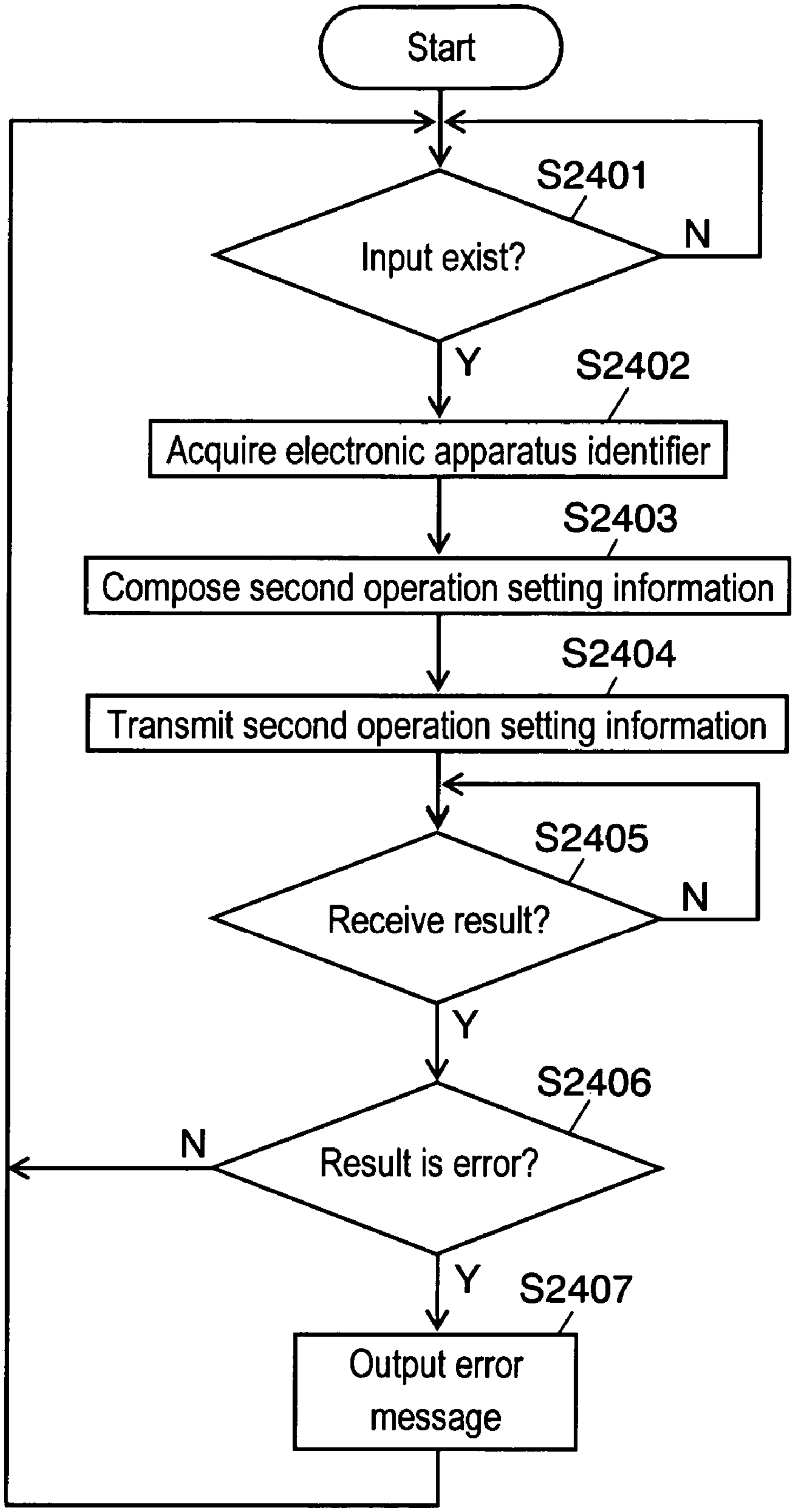
FIG. 24 is a flowchart illustrating an operation of an electronic apparatus according to the third exemplary embodiment of the present invention.

In FIG. 24, an interrupt signal by such as power OFF ends the processing. In addition, in FIG. 24, the processes of S2405 through S2407 are not essential and may be omitted. In such a case, judgment part 22104 and output part 22105 can be dispensed with.

Figure 25:
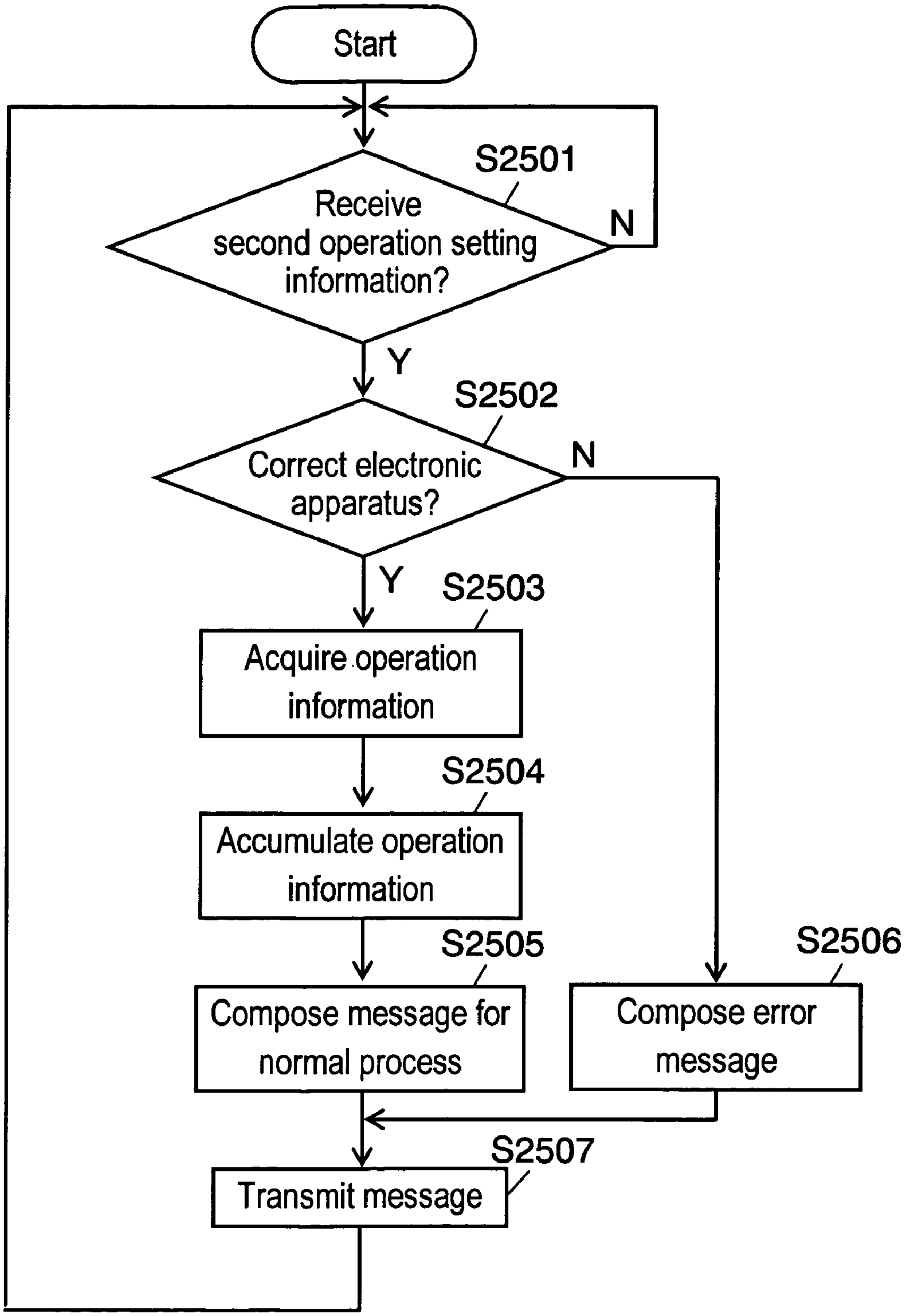
FIG. 25 is a flowchart illustrating an operation of a server according to the third exemplary embodiment of the present invention.

Next, a description is made for an operation in which server 223 receives the second operation setting information from electronic apparatus 221 and accumulates it, referring to FIG. 25.

(S2501) Receiver 1302 judges whether or not receiver 1302 has received second operation setting information. If received, the processing goes to S2502; otherwise, returns to S2501.

(S2502) Updating part 1303 judges whether or not electronic apparatus 11 that transmitted the second operation setting information is a correct electronic apparatus, according to the second operation setting information received at S2501. The judgment is made, for example, by the following method: Second operation setting information includes an electronic apparatus identifier. If the electronic apparatus identifier included in the second operation setting information is stored in the operation information control table included in the server, then the electronic apparatus that transmitted the second operation setting information is judged to be a correct electronic apparatus; otherwise, an incorrect electronic apparatus. If electronic apparatus 11 that has transmitted the second operation setting information is a correct electronic apparatus, the processing goes to S2503; otherwise, goes to S2506.

(S2503) Updating part 1303 acquires operation information from the second operation setting information received at S2501.

(S2504) Updating part 1303 accumulates the operation information acquired at S2503. Updating part 1303 accumulates the operation information, as operation information corresponding to the electronic apparatus, included in the second operation setting information.

(S2505) Composer 22304 composes a message showing a normal process.

(S2506) Composer 22304 composes an error message.

(S2507) Transmitter 22305 transmits the message composed at S2505 or S2506.

In FIG. 25, if an interrupt signal by such as power OFF is input, the process ends. In addition, in FIG. 25, the processes S2505 through S2507 are not essential and may be omitted. In such a case, composer 22304 and transmitter 22305 can be dispensed with.

Next, a description is made for an operation in which server 223 receives an acquisition command for operation information from external apparatus 224, and transmits the operation information to the external apparatus 224. Receiver 22301 of server 223 receives an operation information acquisition command including an external apparatus identifier, and searches the operation information control table, for operation information corresponding to the external apparatus identifier. Transmitter 22302 transmits the operation information retrieved to external apparatus 224. Here, server 223 performs the above-mentioned process, only if the external apparatus identifier included in the operation information acquisition command received is a correct external apparatus identifier. That is to say, server 223 authenticates external apparatus 224.

Figure 26:
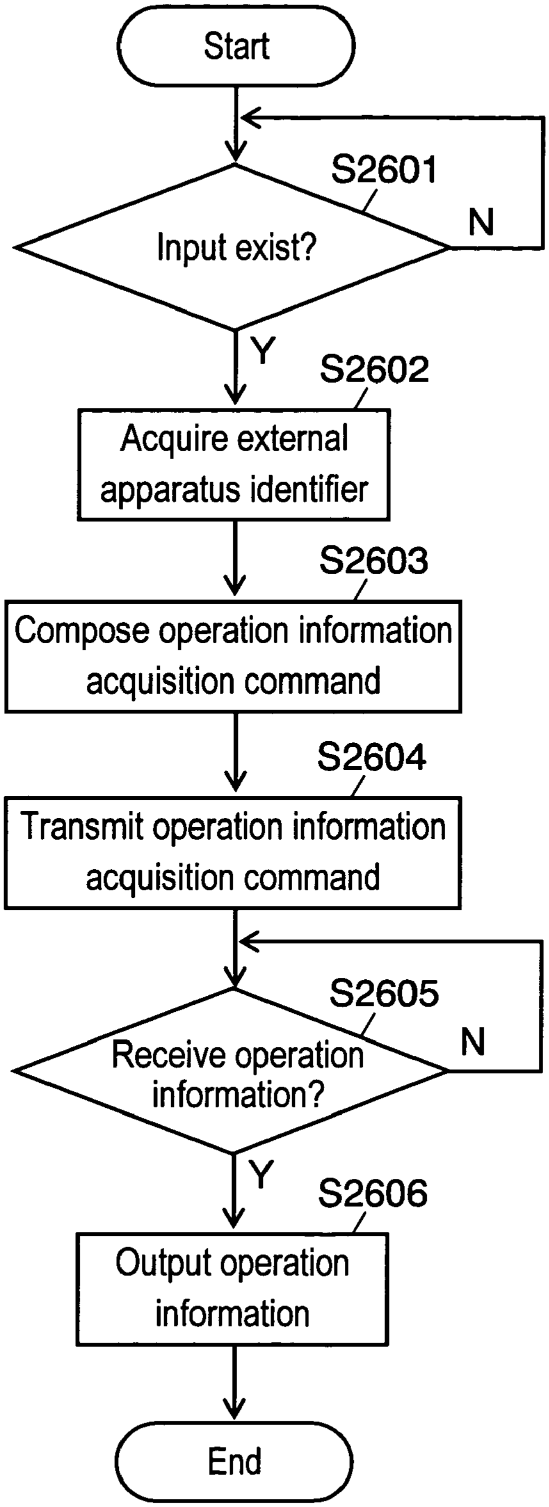
FIG. 26 is a flowchart illustrating an operation of an external apparatus according to the third exemplary embodiment of the present invention.

Next, a description is made for the operation in which external apparatus 224 acquires operation information for electronic apparatus 221, referring to FIG. 26.

(S2601) Acceptor 22401 judges whether or not acceptor 22401 has accepted input of operation information acquisition information. If accepted, the processing goes to S2602; otherwise, returns to S2601.

(S2602) Transmitter 22402 acquires an external apparatus identifier stored in storage 1401.

(S2603) Transmitter 22402 composes an operation information acquisition command, using the operation information acquisition information accepted at S2601 and the external apparatus identifier acquired at S2602.

(S2604) Transmitter 22402 transmits to server 223, the operation information acquisition command composed at S2603.

(S2605) Receiver 22403 judges whether or not receiver 22403 has received operation information from server 223. If received, the processing goes to S2606; otherwise, returns to S2605.

(S2606) Output part 22404 outputs the operation information received at S2605.

Figure 27:
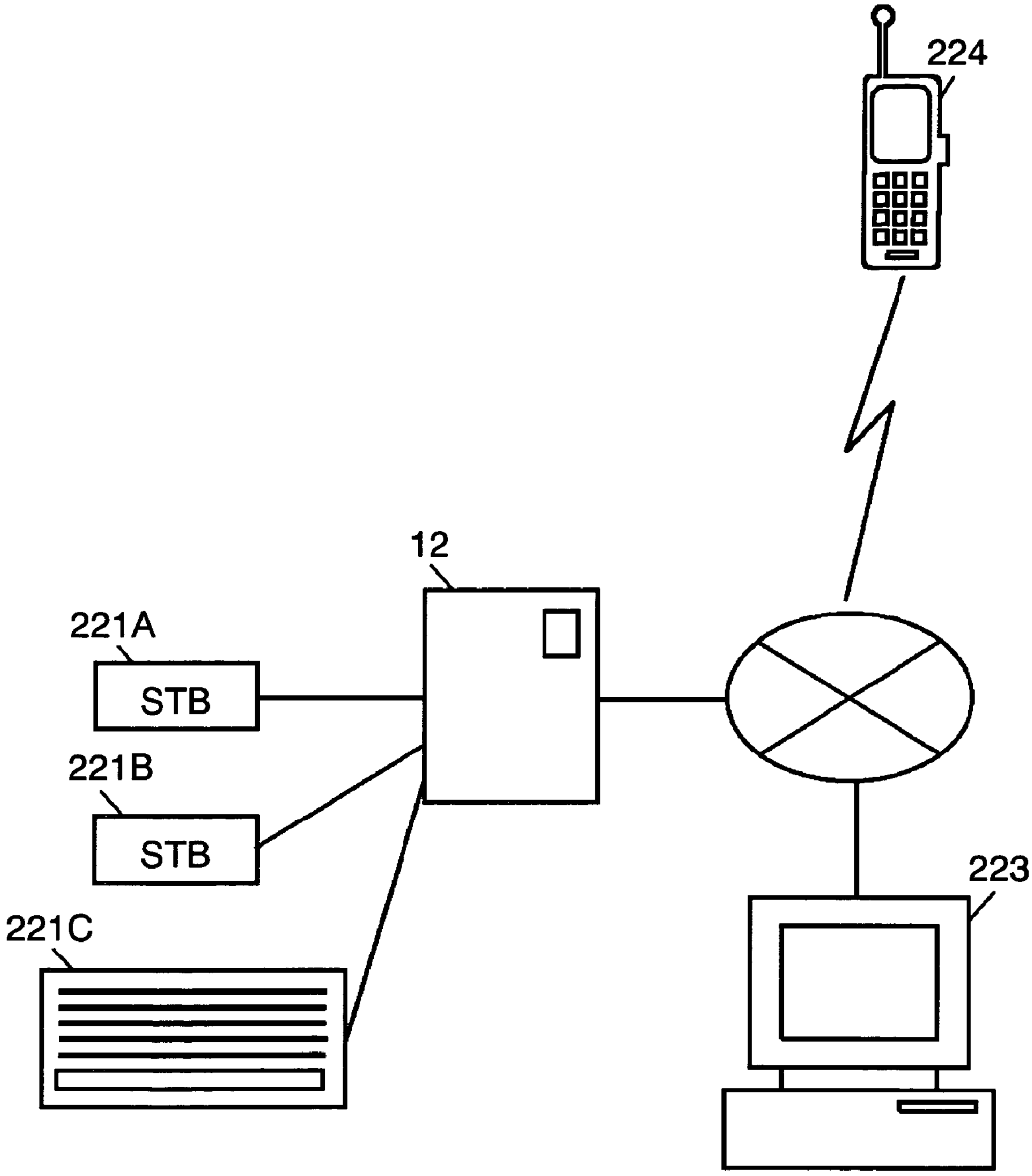
FIG. 27 is a concrete system block diagram of the information processing system according to the third exemplary embodiment of the present invention.

Hereinafter, a description is made for a concrete operation of the information processing system in this embodiment. FIG. 27 shows a block diagram of the information processing system. The information processing system includes STB 221A, STB 221B, air conditioner 221C, router 12, server 223, and external apparatus 224.

Hereinafter, a description is made for an operation to set operation information from electronic apparatus 221 to the operation information control table of server 223. An example for the operation information control table retained by server 223 is the same as in FIG. 8. The user of STB 221B that is "my son's STB" performs operation setting for STB 221B. Here, setting is made for power ON and reserving video recording. Specifically, the operation information input by the user of STB 221B is "power ON, video recording ch. 18, 10:00-12:00." That is to say, the operation information input by the user of STB 221B is one showing the command: turn on the power; record the broadcast on channel 18 from 10:00 to 12:00. Then, STB 221B, for example, when operation information is input, automatically composes second operation setting information, and transmits the second operation setting information to server 223. The second operation setting information is information including operation information "power ON, video recording ch. 18, 10:00-12:00" and ID "2." Then, STB 221B transmits to router 12, information including operation information "power ON, video recording ch. 18, 10:00-12:00" and ID "2." Router 12 adds the global IP address "132.182.5.10" allocated to itself, to the information sent from STB 221B, and transmits it to server 223. Server 223 identifies a setting position for the operation information from the global IP address "132.182.5.10" and ID "2," to accumulate the operation information "power ON, video recording ch. 18, 10:00-12:00," and then transmits a message showing the process has been made normally, via router 12 to STB 221B. After the above-mentioned process, the operation information control table of server 223 is as in FIG. 12.

In the above-mentioned description, electronic apparatus 221, when accepting input of second operation setting information, immediately transmits the information to server 223. Alternatively, electronic apparatus 221 may accumulate operation information and others when accepting input, and may regularly transmit these to server 223

In addition, as mentioned above, the operation information accumulated in server 223 by electronic apparatus 221 can be acquired from external apparatus 224. Further, in the same way as the process in the first exemplary embodiment, operation information for electronic apparatus 221 can be set from external apparatus 224 to server 223. Moreover, electronic apparatus 221 can acquire operation information accumulated in server 223.

According to this embodiment as described above, operation setting for an electronic apparatus at home, connected to the Internet, for example, from an external apparatus such as a mobile phone, is performed via a server. This prevents the electronic apparatus from being accessed from the external apparatus directly, and thus security is retained. In addition, information about operation setting performed for an electronic apparatus at home or the like can be acquired from an external apparatus, without accessing the electronic apparatus directly, and thus security is retained.

Fourth Exemplary Embodiment

Figure 28:
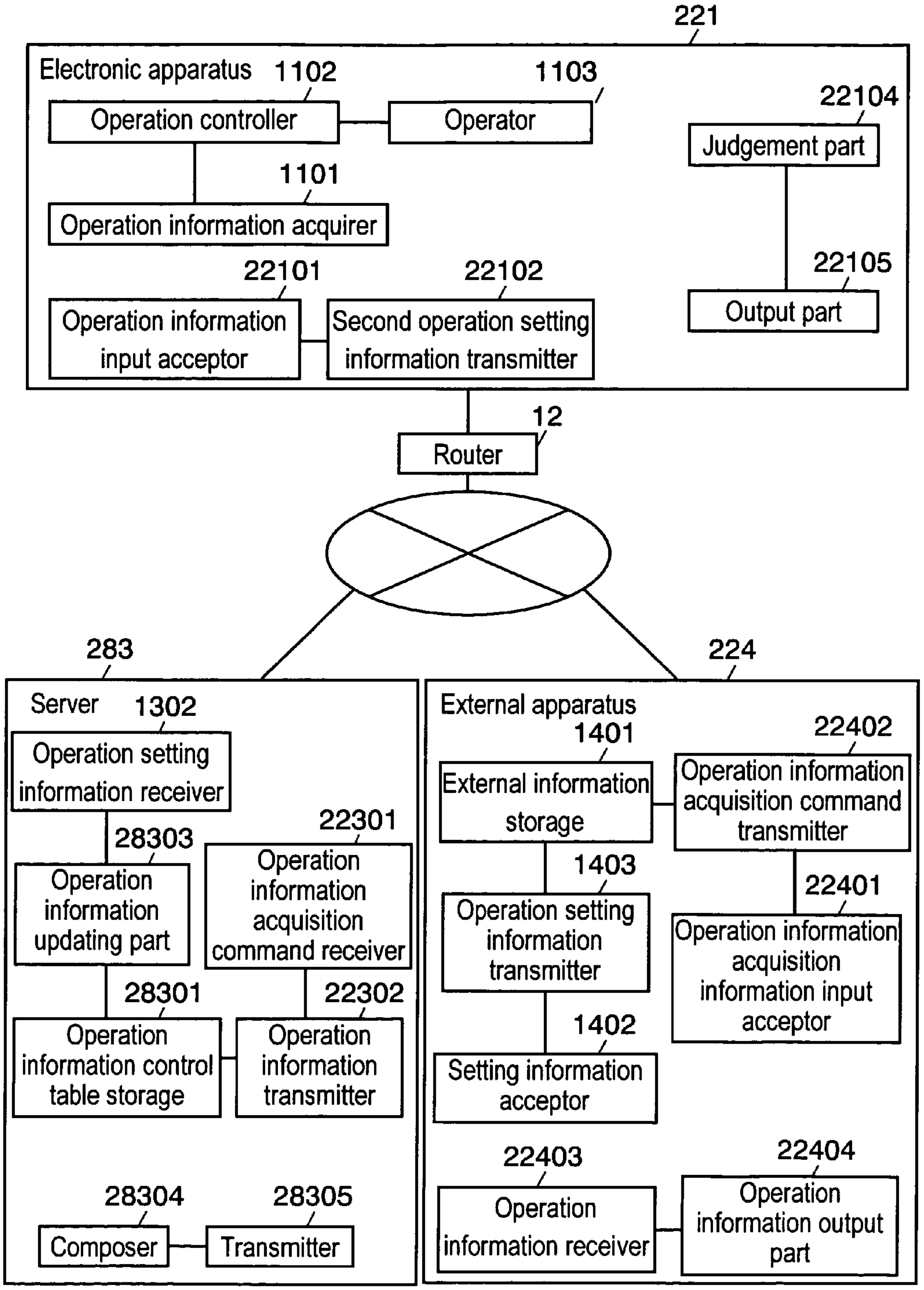
FIG. 28 is a block diagram of an information processing system according to a fourth exemplary embodiment of the present invention.

FIG. 28 is a block diagram of an information processing system according to this embodiment. The information processing system includes electronic apparatus 221, router 12, server 283, and external apparatus 224. Server 283 stores an operation information control table including an operation information control record including operation information of the electronic apparatus, and others. Server 283, connected to the Internet, receives operation setting information from both electronic apparatus 221 and external apparatus 224. Server 283 stores priority information, which is information about which operation setting information has priority, one from electronic apparatus 221 or from external apparatus 224. When receiving operation setting information from both electronic apparatus 221 and external apparatus 224, server 283 updates the operation information control table according to the priority information.

Server 283 includes operation information control table storage (hereinafter, storage) 28301, operation setting information receiver (hereinafter, receiver) 1302, operation information updating part (hereinafter, updating part) 28303, operation information acquisition command receiver (hereinafter, receiver) 22301, operation information transmitter (hereinafter, transmitter) 22302, composer 28304, and transmitter 28305.

In server 283, storage 28301 stores an operation information control table including an operation information control record, the record including an external apparatus identifier which is information for identifying external apparatus 224; an electronic apparatus identifier which is information for identifying electronic apparatus 221; priority information; and operation information. The priority information refers to information about which operation information has priority, when operation information is received from a plurality of apparatuses. Here, the priority information refers to information about which operation information has priority, one from electronic apparatus 221 or one from external apparatus 224. If external apparatuses exist, the priority information relates to an order of priority among these external apparatuses and the electronic apparatus. Storage 28301 is preferably composed of a nonvolatile storage medium; however, it may be composed of a volatile one.

Updating part 28303 updates the operation information control table in storage 28303, according to the operation setting information received by receiver 1302, and the priority information in the operation information control table. The updating includes, for example, adding a record to the operation information control table, and correcting a certain attribute value in the record. Updating part 28303 is usually composed of a CPU (not illustrated) and software to operate it; however, it may be composed of hardware (an electronic circuit).

Composer 28304 composes a message to transmit to electronic apparatus 221, according to whether or not the processes in storage 28301, receiver 1302, and updating part 28303 have normally ended.

Transmitter 28305 transmits to electronic apparatus 221, the message composed by composer 28304.

Figure 29:
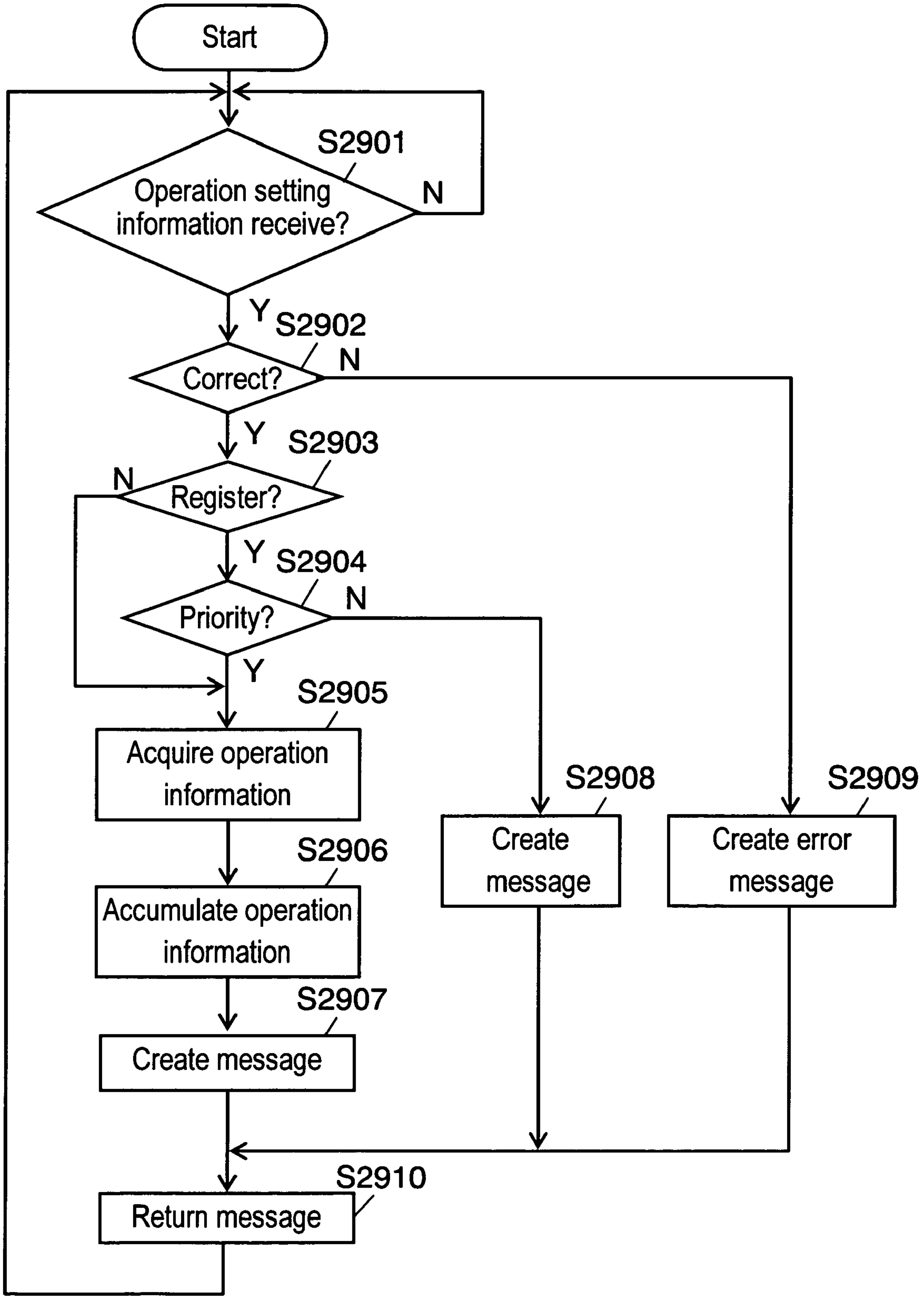
FIG. 29 is a flowchart illustrating an operation of a server according to the fourth exemplary embodiment of the present invention.

Hereinafter, an operation of the information processing system is described. First, a description is made for an operation in which server 283 receives operation setting information from electronic apparatus 221 or external apparatus 224, and accumulates it, referring to FIG. 29.

(S2901) Receiver 1302 judges whether or not receiver 1302 has received operation setting information. If received, the processing goes to S2902; otherwise, returns to S2901.

(S2902) Updating part 28303 checks (authenticates) whether or not electronic apparatus 221 or external apparatus 224 that transmitted the operation setting information is a correct device. If correct, the processing goes to S2903; otherwise, goes to S2909.

(S2903) Updating part 28303 judges whether or not the operation information in the operation information control table corresponding to electronic apparatus 221 or external apparatus 224 that transmitted the operation setting information has already been registered. If registered, the processing goes to S2904; otherwise, jumps to S2905.

(S2904) Updating part 28303 judges which operation information has priority, one included in the operation setting information received, or one registered in the operation information control table. If the received one has priority, the processing goes to S2905, otherwise, goes to S2908. There are various algorithms for determining which operation information has priority. A concrete example for such an algorithm is described hereafter.

(S2905) Updating part 28303 acquires operation information from the operation setting information received.

(S2906) Updating part 28303 accumulates the operation information acquired at S2905. A position where the operation information is accumulated is one for operation information corresponding to an electronic apparatus identifier and external apparatus identifier included in the operation setting information.

(S2907) Composer 28304 composes a message showing that the process has been made normally.

(S2908) Composer 28304 composes a message showing that setting for operation information by an apparatus with higher priority has already been made.

(S2909) Composer 28304 composes an error message (a message showing an incorrect apparatus).

(S2910) Transmitter 28305 sends back one of the messages composed at S2907, S2908, or S2909 to the apparatus that transmitted the operation setting information.

Figures 30, 31:
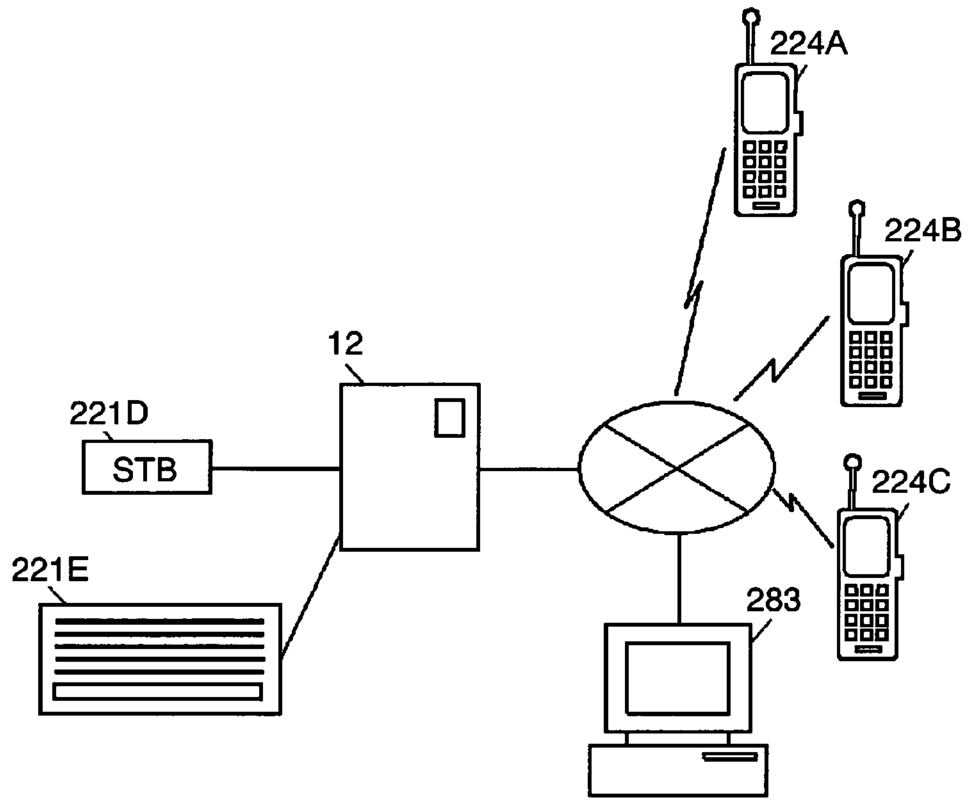
FIG. 30 is a concrete system block diagram of the information processing system according to the fourth exemplary embodiment of the present invention.
FIG. 31 shows an example of an operation information control table according to the fourth exemplary embodiment of the present invention.

Hereinafter, a description is made for a concrete operation of the information processing system in this embodiment. FIG. 30 shows a block diagram of the information processing system. In FIG. 30, the information processing system includes two electronic apparatuses. One is STB 221D (ID=1), and the other is air conditioner 221E (ID=2). STB 221D and air conditioner 221E are connected to the Internet via router 12. The information processing system further includes three external apparatuses 224A through 224C. Three external apparatuses 224A through 224C are all mobile phones, an external apparatus identifier, namely a phone number is allocated to each of them. The phone numbers are "090-1234-5555," "090-2222-5432," and "090-3333-4444," respectively. In addition, the information processing system includes server 283 and router 12.

Server 283 stores an operation information control table shown in FIG. 31. The operation information control table shown in FIG. 31 includes operation information control records, each composed of the attribute values such as an electronic apparatus identifier, a name, operation information, and an external apparatus identifier. The electronic apparatus identifier is composed of three attribute values: a global IP address, an identifier (ID), and priority. The priority refers to information showing priority (order) of operation information (operation setting information) transmitted from the electronic apparatus identified by a global IP address and an ID. If the value of priority is "1," the electronic apparatus has top priority, where the operation information transmitted from the electronic apparatus is always stored in server 283. The higher value of priority shows the lower order of priority. The operation information includes contents and priority. The contents refer to information showing details of the operation information. The priority refers to information showing which priority order of apparatus has transmitted the operation information shown by the contents. The external apparatus identifier includes a phone number and priority. The phone number is one for an external apparatus to identify the external apparatus. The priority shows the order of priority of the operation information transmitted from the external apparatus identified by the phone number. In the first record in FIG. 31, the apparatus with first order of priority is "STB at home," namely STB 221D. Similarly, the apparatus with the second order of priority is external apparatus 224B with its phone number "090-2222-5432," and the third, external apparatus 224A with "090-1234-5555." Further, the operation information in the first record in the operation information control table in FIG. 31: "video recording ch. 10, 19:00-21:00" shows that it is the operation information transmitted from the apparatus with the order of priority "2," namely, external apparatus 224B.

In the above-mentioned situation, a description is made for a case where external apparatus 224A selects STB 221D, also the operation information: "video recording ch. 8, 19:00-20:00," is input and external apparatus 224A transmits it to server 283. In such a case, server 283 receives the operation setting information including the above-mentioned operation information, and the external apparatus identifier: "090-1234-5555." Next, server 283 acquires the order of priority "3" of external apparatus 224A from the external apparatus identifier received. Next, server 283 acquires the order of priority "2" that is the counterpart of the operation information in the operation information control table. Then, server 283 compares the order of priority "3" of external apparatus 224A, with the order of priority "2" that is the counterpart of the operation information, and then determines that server 283 does not accumulate the operation information received. Then, server 283 transmits a message showing that operation information exists that has already been registered by an apparatus with higher order of priority, to external apparatus 224A identified by the external apparatus identifier "090-1234-5555."

Next, a description is made for a case where STB 221D transmits to server 283, the operation information: "video recording ch. 41, 9:00-22:00." In such a case, router 12 adds the global IP address "132.182.5.10" to the operation information and the like, to transmit them to server 283. Next, server 283 receives information including the above-mentioned operation information, the global IP address "132.182.5.10," and "ID=1." Then, server 283 acquires from the operation information control table, "priority" corresponding to a combination of the above-mentioned global IP address and "ID=1." As shown in FIG. 31, "priority" corresponding to a combination of the above-mentioned global IP address and "ID=1" is "1." Server 283 acquires "2," which is "priority" that is the counterpart of the operation information in the operation information control table. Next, server 283 compares "priority=1," which corresponds to a combination of the global IP address "132.182.5.10" and "ID=1," and "priority=2," which is the counterpart of the operation information in the operation information control table. Then, server 283 judges that the operation information received can be accumulated. Next, server 283 rewrites "contents" of the operation information in the first record in the operation control table with "video recording ch. 4, 19:00-22:00". Server 283 further updates "priority" of operation information in the first record in the operation control table, to "1." With the above-mentioned operation, operation information transmitted by an apparatus with higher order of priority is set to server 283; and with lower, not set.

Next, a brief description is made for "air conditioner in the living room," namely air conditioner 221E. In the operation information control table in FIG. 31, "power ON, temperature 20° C." is registered as the operation information for air conditioner 221E. In addition, "priority" in the operation information is "1." In such a case, even if the operation information "power ON, temperature 27° C." is transmitted from external apparatus 224C with its phone number "090-3333-4444," server 283 does not update the operation information. The order of priority of external apparatus 224C is "2," which is lower than "1," which is the order of priority of the apparatus that registered the operation information "power ON, temperature 20° C." Accordingly, server 283 does not update the operation information.

In this embodiment, both a correct electronic apparatus and a correct external apparatus can view (acquire and then output) operation information.

In the above-mentioned embodiment, server 283 stores priority information, which is information about which operation information is given priority when is receives operation information from a plurality of apparatuses. Server 283 updates the operation information control table according to the priority information and operation setting information. This enables setting of the operation information to be properly controlled by a plurality of apparatuses.

In this embodiment, the description is made that server 283 accumulates one piece of operation information for one electronic apparatus. However, server 283 may accumulate some pieces of operation information for one electronic apparatus. Such a condition also can be applied to other embodiments.

Further, in this embodiment, server 283 stores operation information for setting broadcast recording. When server 283 receives operation information for new setting of video recording from an external apparatus or an electronic apparatus, overwrite is not usually needed if the time frames in the operation information for video recording setting do not overlap. Therefore, operation information updating part 28303 in server 283 may accumulate operation information, in consideration of overlapping video recording time. This situation also applies to contents of other operation information in other electronic apparatuses. Such a condition also can be applied to other embodiments.

The above-mentioned method of information processing and controlling of each device may be described in computer programs to be executed. Such programs are stored in a storage of each apparatus, or servers 13, 143, 223, or 283 stores the programs and distributes to each apparatus via a network. Alternatively, they may be stored in other servers on a network to be distributed to each apparatus. They may be recorded on a storage medium such as a flash memory or a CD-ROM, and may be read by a reading device (not illustrated) provided in any one of the servers mentioned above.

The present invention includes an embodiment in which each transmitter, each receiver, each storage, and the like of each apparatus described above are integrated. Further the electronic apparatus and the router may be composed as a unit.

INDUSTRIAL APPLICABILITY

According to the present invention, an electronic apparatus does not need to be directly accessed when an external apparatus sets operation information to the electronic apparatus or acquires status information of the electronic apparatus, improving security.

REFERENCE NUMERALS IN THE DRAWINGS

11, 11A, 11B, 11C, 141, 221A, 221B, 221C, 221D, 221E Electronic apparatus
12 Router
13, 143, 223, 283 Server
14, 144, 224A, 224B, 224C External apparatus
1101 Operation information acquirer
1102 Operation controller
1103 Operator
1301, 28301 Operation information control table storage
1302 Operation setting information receiver
1303, 28303 Operation information updating part
1304 Transmitter
1401 External information storage
1402 Setting information acceptor
1403 Operation setting information transmitter
1404 Receiver
1405 Annunciator
14101 Electronic apparatus identifier storage
14102 Status information storage
14103 Electronic apparatus status information transmitter
14104, 22104 Judgement part
14105, 22105 Output part
14301 Status information control table storage
14302 Electronic apparatus status information receiver
14303 Status information updating part
14304, 22304, 28304 Composer
14305, 22305, 28305 Transmitter
14402 Status information acquisition information acceptor
14403 Status information acquisition command transmitter
14404 Status information receiver
14405 Status information output part
22101 Operation information input acceptor
22102 Second operation setting information transmitter
22301 Operation information acquisition command receiver
22302 Operation information transmitter
22401 Operation information acquisition information input acceptor
22402 Operation information acquisition command transmitter
22403 Operation information receiver
22404 Operation information output part

The invention claimed is:

1. An information processing system including an electronic apparatus, a server, and an external apparatus, wherein the electronic apparatus comprises:

an operation information acquirer for acquiring first operation information from the server, the electronic apparatus operating with the first operation information;

an operation controller for directing so that the electronic apparatus operates according to the first operation information;

an operation information input acceptor for accepting input of second operation information; and a second operation information transmitter for transmitting the second operation information and an electronic apparatus identifier, to the server, the electronic apparatus identifier identifying the electronic apparatus, the external apparatus comprises:

an external information storage for storing an external apparatus identifier, the external apparatus identifier identifying the external apparatus;

a setting information acceptor for accepting input of the electronic apparatus identifier and of the first operation information; and an operation setting information transmitter for transmitting the external apparatus identifier, the electronic apparatus identifier, and the first operation information, to the server, and the server comprises:

an operation information control table storage for storing an operation information control table including at least one operation information control record, the record including the external apparatus identifier, the electronic apparatus identifier, and the first operation information;

an operation setting information receiver for receiving the external apparatus identifier, the electronic apparatus identifier, and the first operation information, from the external apparatus; and an operation information updating part for updating the operation information control table, according to the external apparatus identifier, the electronic apparatus identifier, and the first operation information, wherein the server stores priority information showing a level of priority for each of the first operation information and the second operation information, when the server receives the first operation information from the external apparatus, and the second operation information from the electronic apparatus, and the operation information updating part updates the operation information control table, according to one of the first operation information and the second operation information that is given a higher priority level.

2. The information processing system according to claim 1, wherein the external apparatus further comprises:

an operation information acquisition information input acceptor for accepting input of operation information acquisition information including the electronic apparatus identifier;

an operation information acquisition command transmitter for transmitting an operation information acquisition command to the server, the command including the operation information acquisition information and the external apparatus identifier;

an operation information receiver for receiving the second operation information acquired according to the operation information acquisition command; and an operation information output part that outputs the second operation information.

3. The information processing system according to claim 1, wherein the external apparatus is one of a plurality of external apparatuses, and the server stores the priority information showing the level of priority among pieces of the first operation information when the server receives the pieces of the first operation information from the external apparatuses, and the operation information updating part updates the operation information control table according to one piece of the first operation information that is given the higher priority level.

4. The information processing system according to claim 1, wherein the operation information control record further includes operation information transmission history information, the operation information transmission history information showing that the first operation information has been transmitted to the electronic apparatus, and the operation information updating part updates the operation information transmission history information when the first operation information is transmitted to the electronic apparatus.

5. The information processing system according to claim 1, wherein the operation information acquirer regularly acquires the operation information from the server.

6. The information processing system according to claim 1, wherein the server notifies the electronic apparatus of the first operation information after updating, when the operation information updating part updates the operation information control table.

7. The information processing system according to claim 1, wherein the external apparatus identifier includes an IP address defined in IP version 4, and identifying information inherent in the external apparatus.

8. The information processing system according to claim 1, wherein the external apparatus identifier includes a host address in an IP address defined in IP version 6.

9. An information processing system including an electronic apparatus, a server, and an external apparatus, wherein the electronic apparatus comprises:

an electronic apparatus identifier storage for storing an electronic apparatus identifier, the electronic apparatus identifier identifying the electronic apparatus;

a status information storage for storing status information showing a status of the electronic apparatus;

an electronic apparatus status information transmitter for transmitting the electronic apparatus identifier and the status information to the server, the server comprises:

a status information control table storage for storing a status information control table including at least one status information control record including an external apparatus identifier that identifies the external apparatus, the electronic apparatus identifier, and the status information;

an electronic apparatus status information receiver for receiving the electronic apparatus identifier and the status information from the electronic apparatus; and a status information updating part for updating the status information control table according to the electronic apparatus identifier and the status information received by the electronic apparatus status information receiver, and the external apparatus includes:

an external information storage for storing the external apparatus identifier;

a status acquisition information acceptor for accepting input of status acquisition information, the status acquisition information including the electronic apparatus identifier;

a status acquisition command transmitter for transmitting a status acquisition command including the external apparatus identifier stored in the external information storage and the status acquisition information accepted by the status acquisition information acceptor, to the server; and a status information receiver for receiving the status information acquired according to the status acquisition command, wherein the electronic apparatus acquires first operation information from the server and accepts second operation information, the electronic apparatus operating responsive to one of the first operation information and the second operation information, and the server stores priority information showing a level of priority for each of the first operation information and the second operation information, when the server receives the first operation information from the external apparatus and the second operation information from the electronic apparatus, the server updates an operation information control table, according to one of the first operation information and the second operation information that is given a higher priority level.

10. The information processing system according to claim 9, wherein the external apparatus further includes a status information output part for outputting the status information received by the status information receiver.

11. The information processing system according to claim 9, wherein the external apparatus identifier includes an IP address defined in IP version 4, and identifying information inherent in the external apparatus.

12. The information processing system according to claim 9, wherein the external apparatus identifier includes a host address in an IP address defined in IP version 6.

13. An electronic apparatus for use in an information processing system, the system including the electronic apparatus, a server, and an external apparatus, the electronic apparatus comprising:

an acquirer for acquiring first operation information from the server, the electronic apparatus operating with the first operation information;

a controller for directing so that the electronic apparatus operates according to the first operation information;

an operation information acceptor for accepting input of second operation information; and a second operation information transmitter for transmitting the second operation information and an electronic apparatus identifier, to the server, the electronic apparatus identifier identifying the electronic apparatus, wherein the external apparatus includes:

a first storage for storing an external apparatus identifier, the external apparatus identifier identifying the external apparatus;

a first acceptor for accepting input of the electronic apparatus identifier and the first operation information;

a first transmitter for transmitting the external apparatus identifier, the electronic apparatus identifier, and the first operation information, to the server, and the server includes:

a second storage for storing an operation information control table, the table including at least one operation information control record, the record including the external apparatus identifier, the electronic apparatus identifier, and the first operation information;

a first receiver for receiving the external apparatus identifier, the electronic apparatus identifier, and the first operation information, from the external apparatus; and a first updating part for updating the operation information control table according to the external apparatus identifier, the electronic apparatus identifier, and the first operation information, wherein the server stores priority information showing a level of priority for each of the first operation information and the second operation information, when the server receives the first operation information from the external apparatus, and the second operation information from the electronic apparatus, and the first updating part updates the operation information control table, according to one of the first operation information and the second operation information that is given a higher priority level.

14. The electronic apparatus according to claim 13, wherein the acquirer acquires the operation information from the server regularly.

15. An electronic apparatus for use in an information processing system including the electronic apparatus, a server, and an external apparatus, the electronic apparatus comprising:

a third storage for storing an electronic apparatus identifier, the electronic apparatus identifier identifying the electronic apparatus;

a fourth storage for storing status information, the status information showing a status of the electronic apparatus; and a fourth transmitter for transmitting the electronic apparatus identifier and the status information to the server, wherein the server includes:

a fifth storage for storing a status information control table including at least one status information control record, the record including an external apparatus identifier, the electronic apparatus identifier, and the status information, the external apparatus identifier identifying the external apparatus;

a third receiver for receiving the electronic apparatus identifier and the status information from the electronic apparatus; and a second updating part for updating the status information control table according to the electronic apparatus identifier and the status information receive by the third receiver, and the external apparatus includes:

a sixth storage for storing the external apparatus identifier;

a fourth acceptor for accepting input of status acquisition information, the status acquisition information including the electronic apparatus identifier;

a fifth transmitter for transmitting a status acquisition command including the external apparatus identifier stored in the sixth storage and the status acquisition information accepted by the fourth acceptor, to the server; and a fourth receiver for receiving status information acquired according to the status acquisition command, wherein the electronic apparatus acquires first operation information from the server and accepts second operation information, the electronic apparatus operating responsive to one of the first operation information and the second operation information, and the server stores priority information showing a level of priority for each of the first operation information and the second operation information, when the server receives the first operation information from the external apparatus and the second operation information from the electronic apparatus, the server updates an operation information control table, according to one of the first operation information and the second operation information that is given a higher priority level.

16. A server for use in an information processing system, the system including an electronic apparatus, the server, and an external apparatus, the server comprising:

a second storage for storing an operation information control table including at least one operation information control record, the record including an external apparatus identifier, an electronic apparatus identifier, and first operation information, the external apparatus identifier identifying the external apparatus, the electronic apparatus identifier identifying the electronic apparatus, and the electronic apparatus operating with the first operation information;

a first receiver for receiving the external apparatus identifier, the electronic apparatus identifier, and the first operation information, from the external apparatus; and a first updating part for updating the operation information control table according to the external apparatus identifier, the electronic apparatus identifier, and the first operation information, wherein the electronic apparatus includes:

an acquirer for acquires the first operation information from the server;

a controller for directing so that the electronic apparatus operates according to the first operation information;

an operation information acceptor for accepting input of second operation information; and a second operation information transmitter for transmitting the second operation information and the electronic apparatus identifier, to the server; and the external apparatus includes:

a first storage for storing the external apparatus identifier;

a first acceptor for accepting input of the electronic apparatus identifier and the first operation information; and a first transmitter for transmitting the external apparatus identifier, the electronic apparatus identifier, and the first operation information, to the server, wherein the server stores priority information showing a level of priority for each of the first operation information and the second operation information, when the server receives the first operation information from the external apparatus, and the second operation information from the electronic apparatus, and the first updating part updates the operation information control table, according to one of the first operation information and the second operation information that is given a higher priority level.

17. The server according to claim 16, wherein the operation information control record further includes operation information transmission history information, the operation information transmission history information showing that the first operation information has been transmitted to the electronic apparatus, and the first updating part updates the operation information transmission history information, when the first operation information is transmitted to the electronic apparatus.

18. The server according to claim 16, wherein the server notifies the electronic apparatus of the first operation information after updating, when the first updating part updates the operation information control table.

19. A server for use in an information processing system, the system including an electronic apparatus, the server, and an external apparatus, the server comprising:

a fifth storage for storing a status information control table, the table including at least one status information control record, the record including an external apparatus identifier, an electronic apparatus identifier and status information: the external apparatus identifier identifying the external apparatus, the electronic apparatus identifier identifying the electronic apparatus, and the status information showing a status of the electronic apparatus;

a third receiver for receiving a first electronic apparatus identifier and first status information from the electronic apparatus; and a second updating part for updating the status information control table according to the first electronic apparatus identifier and the first status information, wherein the electronic apparatus includes:

a third storage for storing the first electronic apparatus identifier;

a fourth storage for storing the first status information;

a fourth transmitter for transmitting the first electronic apparatus identifier and the first status information to the server, and the external apparatus includes:

a sixth storage for storing the first external apparatus identifier;

a fourth acceptor for accepting input of status acquisition information, the status acquisition information including the first electronic apparatus identifier;

a fifth transmitter for transmitting a status acquisition command to the server, the command including the first external apparatus identifier stored in the sixth storage and the status acquisition information accepted by the fourth acceptor; and a fourth receiver for receiving status information acquired according to the status acquisition command, wherein the electronic apparatus acquires first operation information from the server and accepts second operation information, the electronic apparatus operating responsive to one of the first operation information and the second operation information, and the server stores priority information showing a level of priority for each of the first operation information and the second operation information, when the server receives the first operation information from the external apparatus and the second operation information from the electronic apparatus, the server updates an operation information control table, according to one of the first operation information and the second operation information that is given a higher priority level.

20. An external apparatus for use in an information processing system, the system including an electronic apparatus, a server, and the external apparatus, the external apparatus comprising:

a first storage for storing an external apparatus identifier, the external apparatus identifier identifying the external apparatus;

a first acceptor for accepting input of an electronic apparatus identifier and first operation information, the electronic apparatus identifier identifying the electronic apparatus and the electronic apparatus operating with the first operation information; and a first transmitter for transmitting the external apparatus identifier, the electronic apparatus identifier, and the first operation information, to the server, wherein the electronic apparatus includes:

an acquirer for acquiring the first operation information from the server;

a controller for directing so that the electronic apparatus operates according to the first operation information;

an operation information acceptor for accepting input of second operation information; and a second operation information transmitter for transmitting the second operation information and the electronic apparatus identifier, to the server, and the server includes:

a second storage for storing an operation information control table, the table including at least one operation information control record, the record including the external apparatus identifier, the electronic apparatus identifier, and the first operation information;

a first receiver for receiving the external apparatus identifier, the electronic apparatus identifier, and the first operation information, from the external apparatus; and a first updating part for updating the operation information control table according to the external apparatus identifier, the electronic apparatus identifier, and the first operation information, wherein the server stores priority information showing a level of priority for each of the first operation information and the second operation information, when the server receives the first operation information from the external apparatus, and the second operation information from the electronic apparatus, and the first updating part updates the operation information control table, according to one of the first operation information and the second operation information that is given a higher priority level.

21. An external apparatus for use in an information processing system, the system including an electronic apparatus, a server, and the external apparatus, the external apparatus comprising:

a sixth storage for storing an external apparatus identifier, the external apparatus identifier identifying the external apparatus;

a fourth acceptor for accepting input of status acquisition information including an electronic apparatus identifier, the electronic apparatus identifier identifying the electronic apparatus;

a fifth transmitter for transmitting a status acquisition command and status acquisition information accepted by the fourth acceptor, to the server, the command including the external apparatus identifier stored in the sixth storage; and a fourth receiver for receiving status information acquired according to the status acquisition command, wherein the electronic apparatus includes:

a third storage for storing the electronic apparatus identifier;

a fourth storage for storing the status information; and a fourth transmitter for transmitting the electronic apparatus identifier and the status information, to the server, and the server includes:

a fifth storage for storing a status information control table, the table including at least one status information control record, the record including the external apparatus identifier, the electronic apparatus identifier, and the status information;

a third receiver for receiving the electronic apparatus identifier and the status information, from the electronic apparatus; and a second updating part for updating the status information control table according to the electronic apparatus identifier and the status information received by the third receiver, wherein the electronic apparatus acquires first operation information from the server and accepts second operation information, the electronic apparatus operating responsive to one of the first operation information and the second operation information, and the server stores priority information showing a level of priority for each of the first operation information and the second operation information, when the server receives the first operation information from the external apparatus and the second operation information from the electronic apparatus, the server updates an operation information control table, according to one of the first operation information and the second operation information that is given a higher priority level.

22. The external apparatus according to claim 21 further comprising a second output part for outputting the status information received by the fourth receiver.

* * * * *